US010692472B2

(12) United States Patent
Chae et al.

(10) Patent No.: US 10,692,472 B2
(45) Date of Patent: Jun. 23, 2020

(54) METHOD AND DEVICE FOR ADJUSTING RESOLUTION OF ELECTRONIC DEVICE

(71) Applicant: Samsung Electronics Co., Ltd., Suwon-si, Gyeonggi-do (KR)

(72) Inventors: Sangwon Chae, Seoul (KR); Jung Nam, Yongin-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/741,900

(22) PCT Filed: Jul. 28, 2016

(86) PCT No.: PCT/KR2016/008281
§ 371 (c)(1),
(2) Date: Jan. 4, 2018

(87) PCT Pub. No.: WO2017/026709
PCT Pub. Date: Feb. 16, 2017

(65) Prior Publication Data
US 2018/0197508 A1 Jul. 12, 2018

(30) Foreign Application Priority Data
Aug. 12, 2015 (KR) .................. 10-2015-0113654

(51) Int. Cl.
*G09G 5/391* (2006.01)
*H04N 9/31* (2006.01)
(Continued)

(52) U.S. Cl.
CPC .......... *G09G 5/391* (2013.01); *G06F 1/3206* (2013.01); *G06F 1/3218* (2013.01);
(Continued)

(58) Field of Classification Search
None
See application file for complete search history.

(56) References Cited

U.S. PATENT DOCUMENTS 7,516,255 B1 * 4/2009 Hobbs .................. G06F 3/1454
348/474
8,462,165 B1 * 6/2013 Han ....................... G06F 13/14
345/520

(Continued)

FOREIGN PATENT DOCUMENTS

| CN | 104637460 A | 5/2015 |
|---|---|---|
| KR | 10-2009-0034108 A | 4/2009 |

(Continued)

OTHER PUBLICATIONS

Nicole Cozma, "Add shortcuts to your notification shade on Android", Jul. 25, 2012, URL: https://www.cnet.com/how-to/add-shortcuts-to-your-notification-shade-on-android/.*

(Continued)

*Primary Examiner* — David H Chu
(74) *Attorney, Agent, or Firm* — Jefferson IP Law, LLP

(57) ABSTRACT

A method for adjusting the resolution of an electronic device may comprise the operations of changing resolution of a screen, which is displayed through a display functionally connected to the electronic device, when a load of a system resource is sensed, and displaying the screen through the display on the basis of an image having the changed resolution.

14 Claims, 18 Drawing Sheets

(51) Int. Cl.
*H04N 5/44* (2011.01)
*G06F 3/0488* (2013.01)
*G06F 1/3206* (2019.01)
*G06F 1/3218* (2019.01)
*G06F 1/3234* (2019.01)
*G06T 3/40* (2006.01)
*G06F 3/0484* (2013.01)

(52) U.S. Cl.
CPC .......... *G06F 1/3265* (2013.01); *G06F 3/0488* (2013.01); *G06T 3/40* (2013.01); *H04N 5/44* (2013.01); *H04N 9/31* (2013.01); *G06F 3/04847* (2013.01); *G06F 2203/04806* (2013.01); *G09G 2330/021* (2013.01); *G09G 2340/04* (2013.01); *G09G 2340/0407* (2013.01); *G09G 2354/00* (2013.01); *G09G 2360/08* (2013.01); *Y02D 10/153* (2018.01)

(56) References Cited

U.S. PATENT DOCUMENTS

| | | | |
|---|---|---|---|
| 2007/0014480 | A1 | 1/2007 | Sirohey et al. |
| 2010/0287059 | A1* | 11/2010 | McCoy ................ D06F 39/005 705/26.5 |
| 2011/0085188 | A1* | 4/2011 | Matsuoka ............ H04N 1/0035 358/1.9 |
| 2012/0105452 | A1* | 5/2012 | Diard ..................... G06T 3/40 345/428 |
| 2012/0176382 | A1 | 7/2012 | Noh |
| 2013/0031589 | A1 | 1/2013 | Casanova et al. |
| 2013/0169765 | A1* | 7/2013 | Park ....................... H04N 7/142 348/54 |
| 2013/0208080 | A1* | 8/2013 | Lukasik .................. H04N 7/15 348/14.09 |
| 2014/0068007 | A1* | 3/2014 | O'Gorman ............. H04N 7/147 709/219 |
| 2014/0092140 | A1* | 4/2014 | Wadhwa .................. G09G 3/20 345/660 |
| 2014/0235222 | A1* | 8/2014 | Gonen ............. H04M 1/72519 455/418 |
| 2014/0359456 | A1* | 12/2014 | Thiele .................. H04W 4/027 715/735 |
| 2015/0085077 | A1* | 3/2015 | Kim ...................... H04N 5/2353 348/46 |
| 2016/0249106 | A1* | 8/2016 | Lachwani ...... H04N 21/234309 |
| 2018/0197508 | A1* | 7/2018 | Chae ..................... G09G 5/391 |

FOREIGN PATENT DOCUMENTS

| | | |
|---|---|---|
| KR | 10-2011-0025394 A | 3/2011 |
| KR | 10-2013-0109361 A | 10/2013 |
| KR | 10-1404203 B1 | 6/2014 |

OTHER PUBLICATIONS

Chinese Office Action dated Nov. 20, 2019, issued in Chinese Application No. 201680046224.3.

* cited by examiner

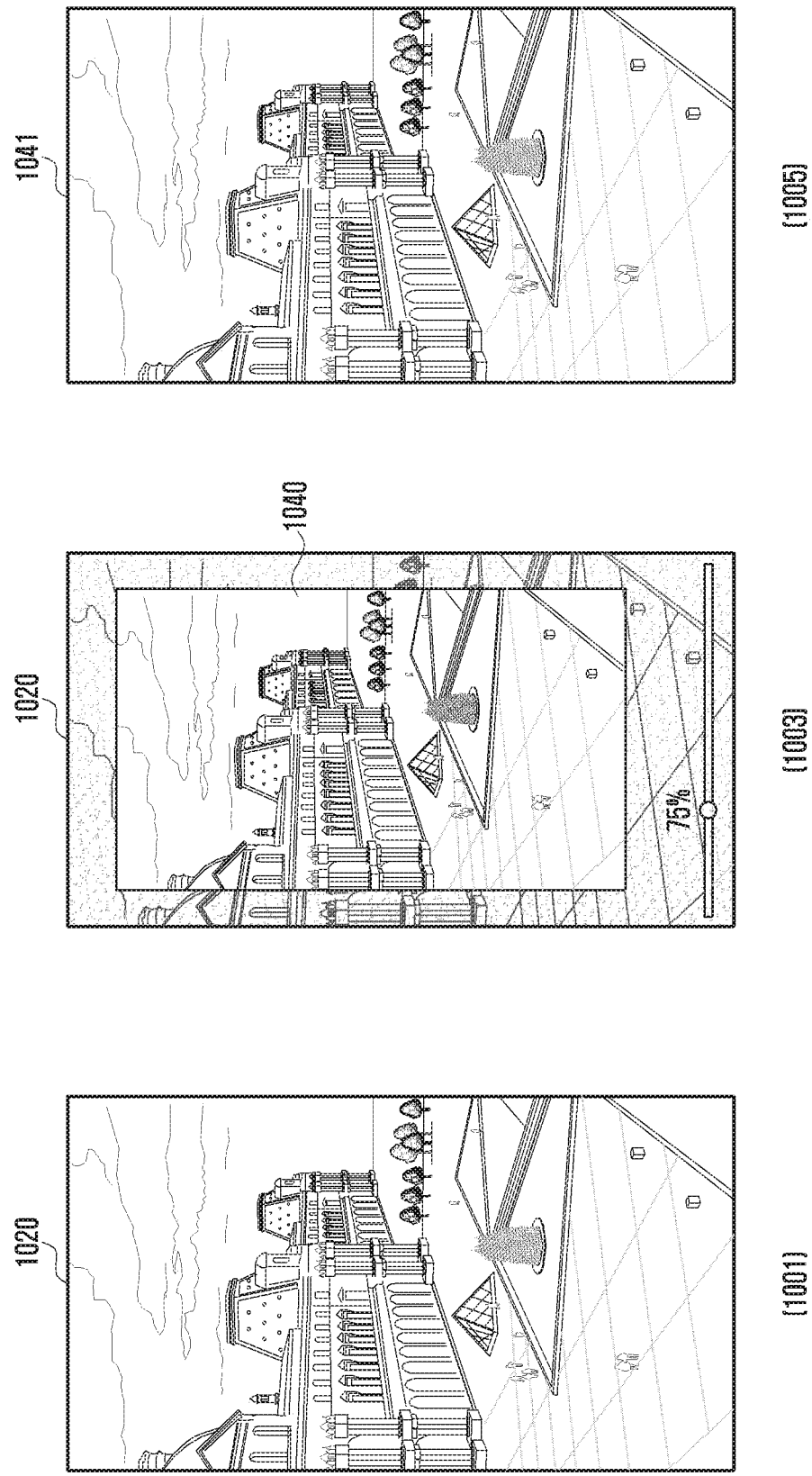

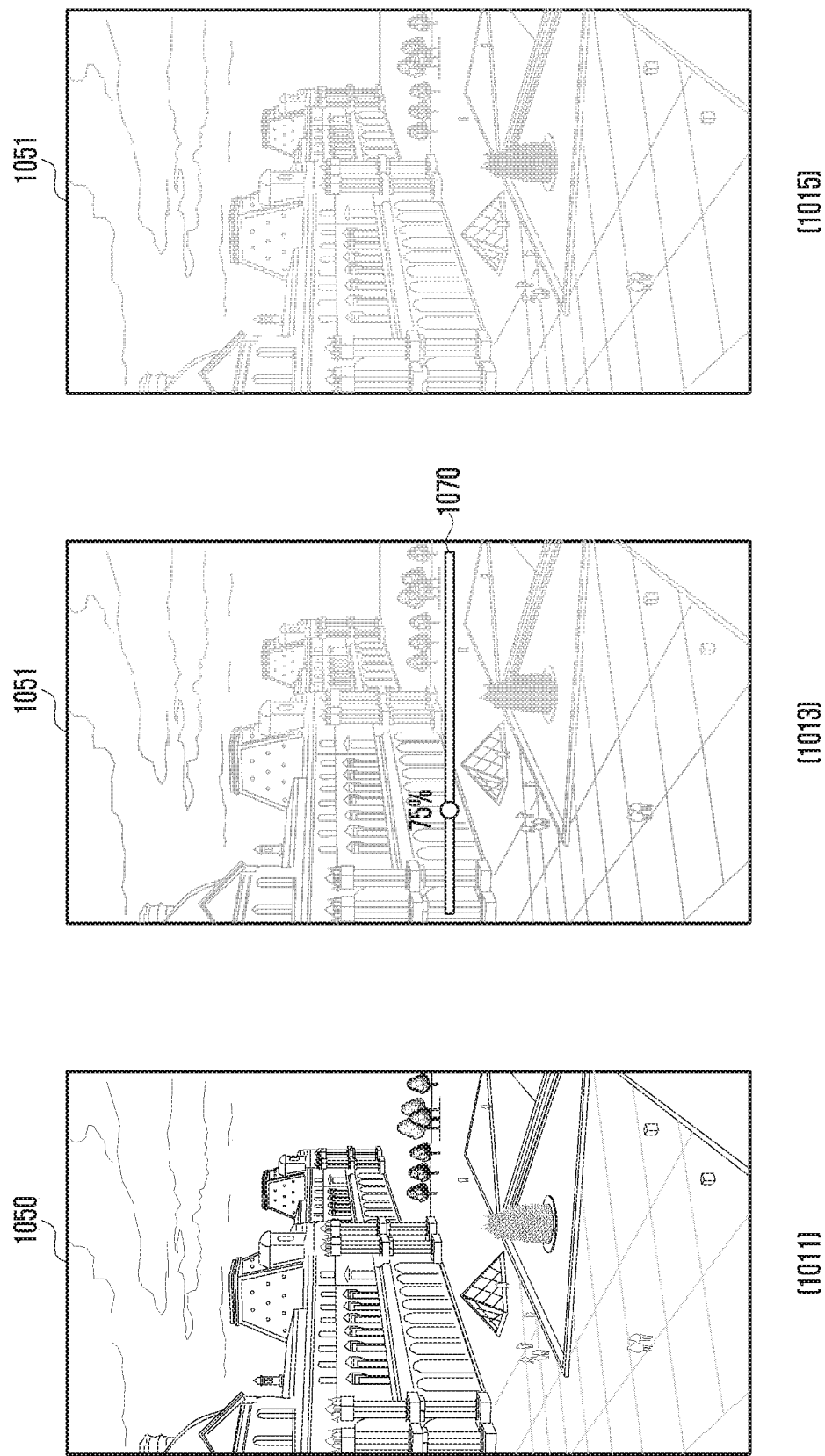

METHOD AND DEVICE FOR ADJUSTING RESOLUTION OF ELECTRONIC DEVICE

TECHNICAL FIELD

Various embodiments of the present invention relate to a method and a device for adjusting resolution in electronic equipment.

BACKGROUND ART

As portable electronic devices such as a smartphone or a tablet PC become popular, hardware and/or software of the electronic devices are rapidly developing and the user environment of the portable electronic device becomes similar to that of a personal computer. Further, the electronic device can provide convenient functions for a user by receiving various applications such as a music application, movie application, or digital broadcasting application from the internet or App store. Further, the electronic device may include a display supporting various resolutions in order to display contents such as a photo or a video while executing various applications.

DISCLOSURE OF INVENTION

Technical Problem

If a display supporting a high resolution is installed in an electronic device such as a smartphone or a tablet PC, the electronic device may require more electric current consumption, and problems may occur in using the electronic device efficiently. For example, a frame buffer size may increase to display the high resolution, and accordingly the electric current consumption and/or resource use of the electronic device may increase.

Various embodiments of the present invention can provide a method and a device for adjusting resolution of a display functionally connected to an electronic device based on a system load of the electronic device (e.g., portable electronic device or portable terminal).

Solution to Problem

In order to solve the above problems, a method for adjusting resolution of an electronic device according to various embodiments of the present invention may include the operations of changing resolution of a screen being displayed through a display connected functionally to the electronic device, if a load of a system resource is detected; and displaying the screen through the display based on an image having the changed resolution.

An electronic device according to various embodiments of the present invention may include a display; an input/output interface; a memory; and a processor. The processor controls to change resolution of a screen being displayed through the display connected functionally to the electronic device if a load of a system resource is detected, and to display the screen through the display based on an image having the changed resolution.

Advantageous Effects of Invention

An electronic device and a method according to various embodiments can reduce electric current consumption and improve a system performance by adjusting the resolution of the electronic device according to the electric current consumption and/or a resource load.

BRIEF DESCRIPTION OF DRAWINGS

FIGS. 10a and 10b illustrate a method for adjusting resolution of the electronic device of FIG. 9 according to various embodiments of the present invention.

MODE FOR THE INVENTION

Figure 1:
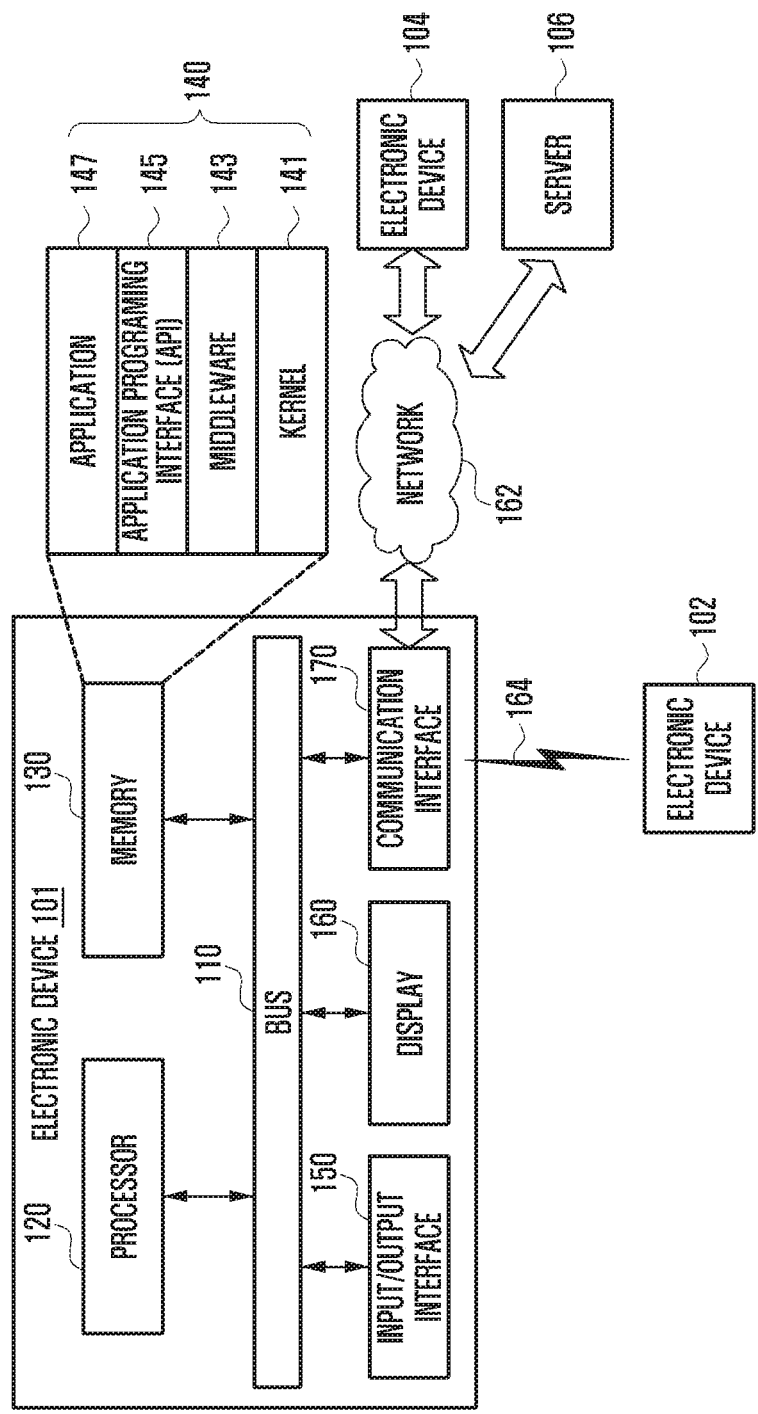
FIG. 1 is a block diagram illustrating an electronic device in a network environment according various embodiments of the present invention.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Navigation Satellite System (GNSS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 101 according to various embodiments of the present disclosure. Referring to FIG. 1, the electronic device 100 includes a bus 110, a processor 120, a memory 130, a input/output interface 150, a display 160 and a communication interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 160 may access a network 162 through wireless or wired communication to communicate with the external device. The wireless communication includes at least one of, for example, WiFi, BlueTooth (BT), Near Field Communication (NFC), a Global Navigation Satellite System (GNSS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
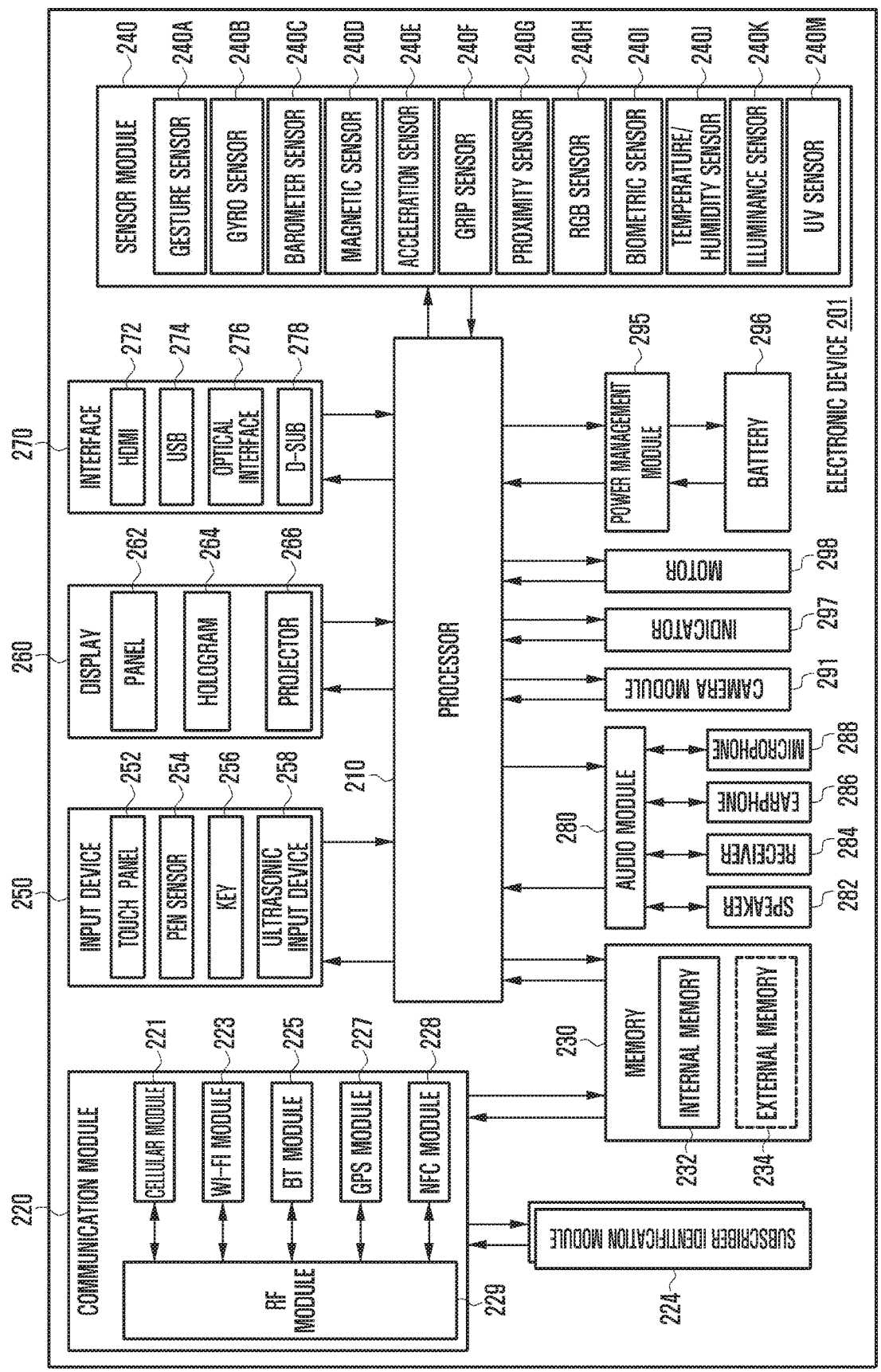
FIG. 2 is a block diagram illustrating a configuration of an electronic device according various embodiments of the present invention.

FIG. 2 is a block diagram 200 of an electronic device 200 according to various embodiments of the present disclosure. The electronic device 200 may configure, for example, a whole or a part of the electronic device 100 illustrated in FIG. 1. Referring to FIG. 2, the electronic device 200 includes one or more Application Processors (APs) 210, a communication interface 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication interface 220 (for example, communication interface 170) transmits/receives data in communication between different electronic devices (for example, the electronic device 104 and the server 106) connected to the electronic device 200 (for example, electronic device 100) through a network. According to an embodiment, the communication interface 220 includes a cellular module 221, a WiFi module 223, a BlueTooth (BT) module 225, a Global Navigation Satellite System (GNSS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GNSS module 227, and the NFC module 228 may include, for example, a processor for processing data transmitted/received through the corresponding module. Although the cellular module 221, the WiFi module 223, the BT module 225, the GNSS module 227, and the NFC module 228 are illustrated as blocks separate from each other in FIG. 8, at least some (for example, two or more) of the cellular module 221, the WiFi module 223, the BT module 225, the GNSS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GNSS module 227, and the NFC module 228 share one RF module 229 in FIG. 2, at least one of the cellular module 221, the WiFi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication interface 220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
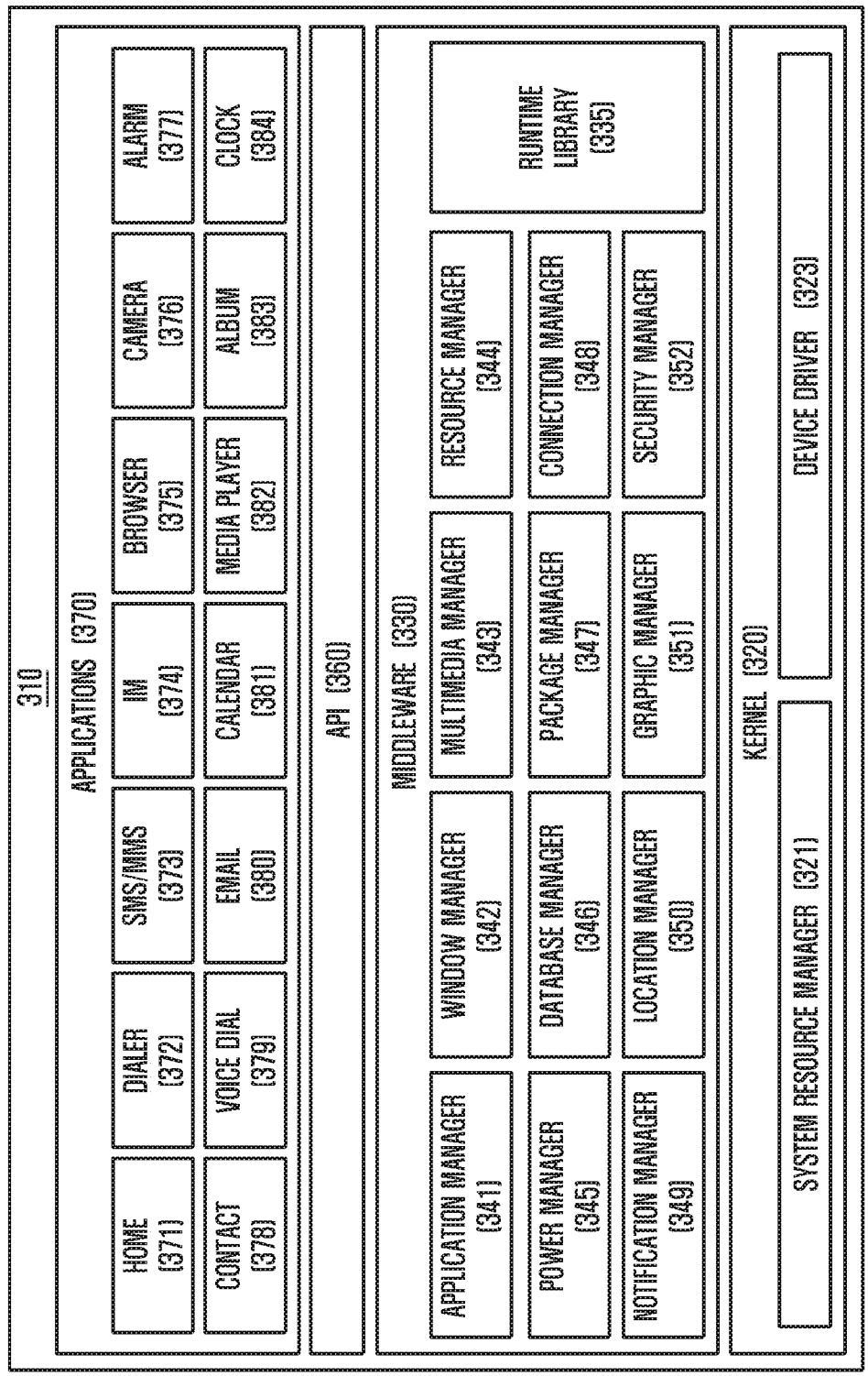
FIG. 3 is a block diagram illustrating a configuration of a program module according various embodiments of the present invention.

FIG. 3 is a block diagram of a programming module 310 according to an embodiment. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may be Android, iOS, Windows, Symbian, Tizen, Bada or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like.

The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4A:
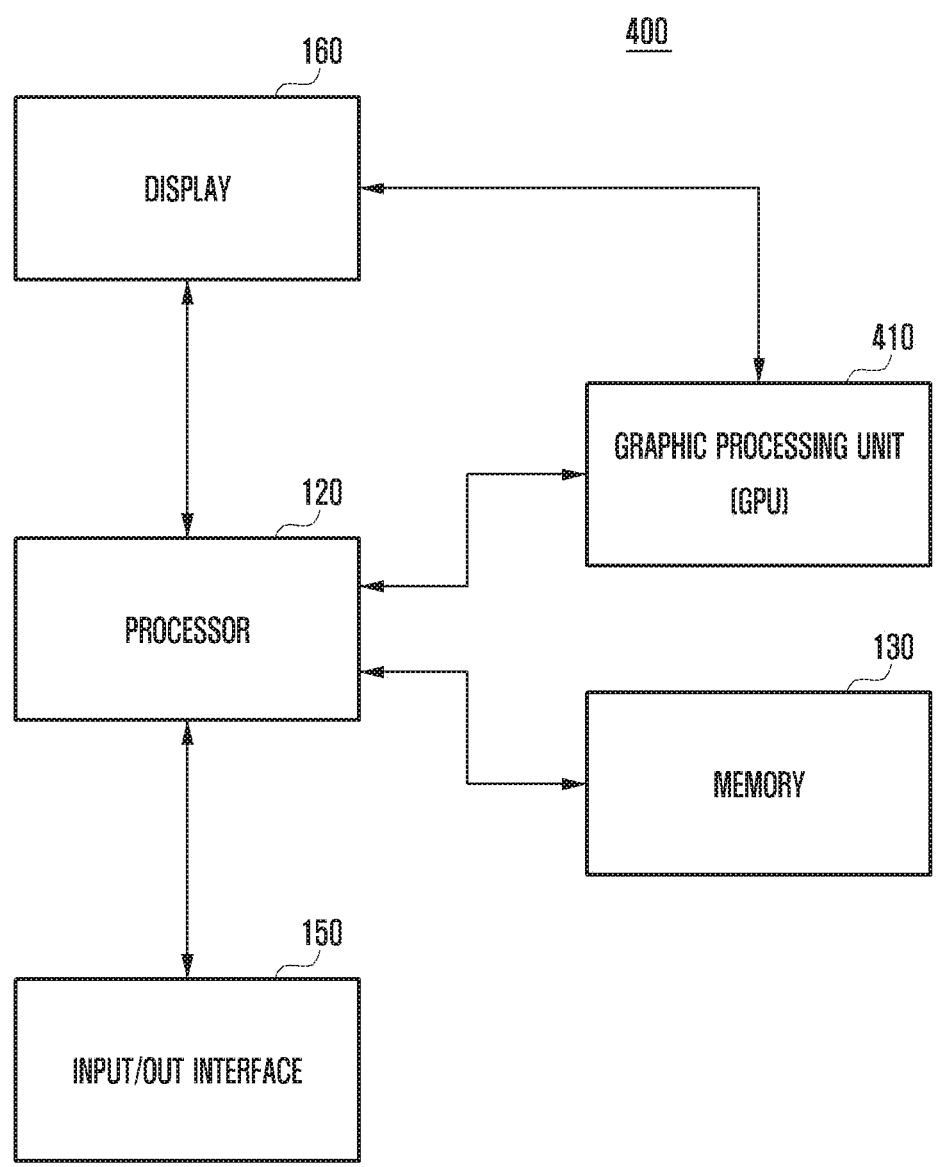
FIGS. 4a and 4b illustrate a configuration of an electronic device according to various embodiments of the present invention.
Figure 4B:
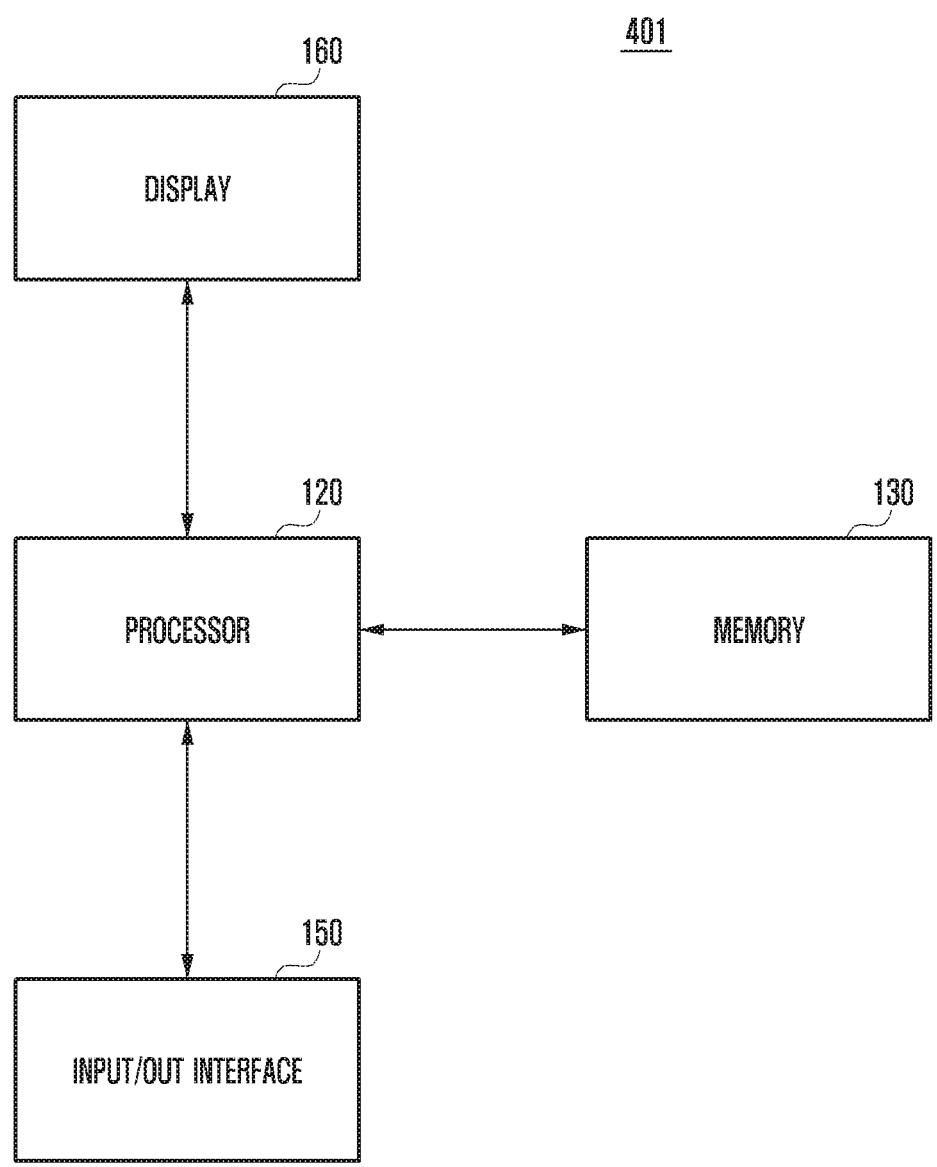

FIGS. 4a and 4b illustrate a configuration of electronic devices 400 and 401 according to various embodiments of the present invention.

With reference to FIG. 4a, the electronic device 400 may include a processor 120, memory 130, input/output interface 150, display 160, and graphic processing unit (GPU) 410.

According to various embodiments, the processor 120 (e.g., processor 210) can determine resolution of a screen to be displayed in the display 160 functionally connected to the electronic device 400 (e.g., processor 120) based on status information of the electronic device 400. For example, the processor 120 can determine resolution of a screen to be displayed in the display 160 based on at least one of an external input (e.g., user input), system resource load, or power consumption obtained through the input/output interface 150 (e.g., input device 250) functionally connected to the electronic device 400 (e.g., processor 120).

According to various embodiments, the input/output interface 150 can be configured with a touch response device (e.g., touch panel 252) on the display 160, and a user input may include a touch event transmitted from the touch response device. Further, the input/output interface 150 can obtain a user input through a sensor module 240 functionally connected to the electronic device 400. The user input obtained through the sensor module 240 may include a proximity event or an acceleration event.

According to various embodiments, the processor 120 can check a system resource load amount or control the memory 130 to store a user or system input value for each application. The system resource load amount may include an amount of power consumed by the electronic device 400 or an internal temperature measured in the electronic device 400. The system input value may include a command, message or data generated by the processor 120. The system resource load may include a residual amount of the battery 296, occupancy of the memory 130, load of the processor 120, and/or number of external electronic devices receiving a wireless charging power from the electronic device 400 or power amount supplied by the electronic device 400 in a wireless charging state.

According to various embodiments, the system resource load of the electronic device 400 can be obtained by figuring out the residual amount of the battery 296, occupancy of the memory 130, load of the processor 120, and/or number of external electronic devices receiving a wireless charging power from the electronic device 400 or power amount supplied by the electronic device 400 in a wireless charging state.

According to various embodiments, if the residual amount of the battery 296, load of the processor, and/or power supply amount is less than a predetermined value, the electronic device 400 can identify a system resource load state through the processor 120.

According to various embodiments, user or system input values for each application can be stored in a database of the memory 130.

The memory 130 can transmit the user or system input values for each application from the database to the processor whenever the application is executed in the foreground. For example, the processor 120 can determine resolution of a screen to be displayed based on the transmitted input value. If the resolution of the screen is determined, resolution can be transmitted to the graphic processing unit 410.

The graphic processing unit 410 can generate an image according to the determined resolution and display a screen in the display 160.

According to various embodiments, the processor 120, memory 130, input/output interface 150, and display 160 included in the electronic device 400 of FIG. 4a may be identical to the components of the electronic device 101 of FIG. 1. Here, the processor 120 may include at least one of a central processing unit (CPU), application processor (AP), or communication processor (CP).

With reference to FIG. 4b, the electronic device 401 may include a processor 120, memory 130, input/output interface 150, and display 160.

The electronic device 401 of FIG. 4b may have the same configuration and function as the electronic device 400 of FIG. 4a by excluding the processor 120 and the graphic processing unit 410. Although the electronic device 400 of FIG. 4a has a graphic processing unit 410 configured separately from the processor 120, the electronic device 401 of FIG. 4b is not configured with the graphic processing unit 410 and the processor 120 of the electronic device 401 can perform the operation of the graphic processing unit 410.

Hereinafter, the electronic device 201 of FIG. 2, and electronic devices 400 and 401 respectively of FIG. 4a and FIG. 4b are configured as variations of the electronic device 101 of FIG. 1 according to the present invention, and the electronic devices 101, 201, 400, and 401 may be configured by including at least one of the above components, omitting some of them, or including other additional components.

According to various embodiments, although all the components of the electronic devices 400 and 401 are illustrated with a configuration including in one electronic device (e.g., electronic device 600), various embodiments of the present invention are not limited to this example. For example, at least one part of the electronic devices 400 and 401 can be configured separately in the electronic devices 400 and 401 and external devices (e.g., first external electronic device 102, second external electronic device 104, or server 106 of FIG. 1) according to the role, function, or performance of the electronic devices 400 and 401. For example, the input/output interface 150 and/or display 160 of the electronic devices 400 and 401 can be included in the external devices, and the processor 120 and/or memory 130 can be included in the electronic devices.

Figure 5:
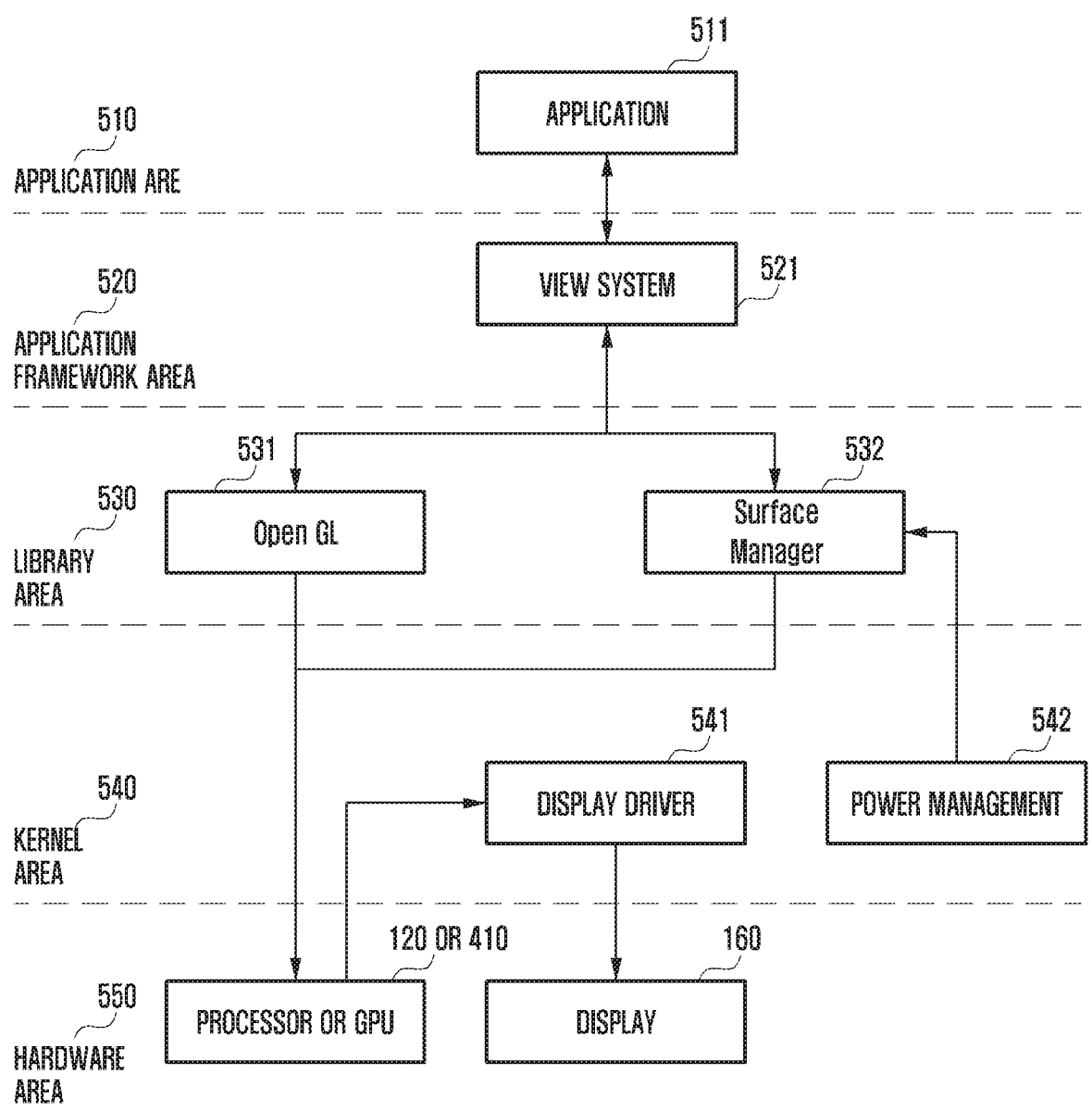
FIG. 5 illustrates a view hierarchy of an electronic device according to various embodiments of the present invention.

FIG. 5 illustrates a view hierarchy of an electronic device 101 according to various embodiments of the present invention.

According to various embodiments, the view hierarchy of the electronic device 101 may include an application area 510, application framework area 520, library area 530, kernel area 540, and/or hardware area 550. The application area 510 may include an application 511 and the application framework area 520 may include a view system 521. Further, the library area 530 may include an openGL 531 and/or surface manager 532, and the kernel area 540 may include a display driver 541 and/or power management module 542 (e.g., power management module 295). Further, the hardware area 550 may include a processor 120, graphic processing unit 410, or display 160.

According to various embodiments, if the application 511 of the application area 510 is executed, a configuration of a screen related to the application 511 can be requested to the view system 521 of the application framework area 520. The view system 521 can obtain data related to the screen configuration from the library area 530 or transmit data to the library area 530.

According to various embodiments, the application 511 can request the view system 521 for a screen configuration. The view system 521 of the application framework area 520 can request the openGL 531 and/or surface manager 532 for the screen configuration according to the request from the application 511.

According to various embodiments, the openGL 531 of the library area 530 can perform an operation of rendering the execution screen of the application 511.

According to various embodiments, the surface manager 532 may be configured with a window manager 342, surface flinger, and/or activity manager. The surface manager 532 can generate a window and/or surface of the application 511 according to the request from the view system 521. The surface manager 532 handles the generated surfaces as layers and can generate an image.

According to various embodiments, the window manager 342 can determine resolution, allocate a frame buffer according to a virtual resolution, render a content fit for a corresponding frame, and resize a screen according to a screen resolution by using a hardware scaler.

According to various embodiments, the surface manager 532 can change the resolution of the image according to power information (e.g., electric current, voltage, or power) provided for the power management module 542 (e.g., may be same as the power management module 295 of FIG. 2 or power manager 345 of FIG. 3).

According to various embodiments, if a power consumed by the electronic device 101 is greater than a predetermined value or a system load is detected (e.g., high power consumption), a command for changing resolution can be requested to the processor 120 so that the resolution can be changed by the surface manager 532. Further, the command for changing resolution can be requested to the processor 120 so that electric consumption is reduced or a system load is released and the resolution of a screen being displayed in the display 160 can be changed to a lower value. The resolution change can be performed by an external input (e.g., user input).

According to various embodiments, the surface manager 532 can transmit the changed resolution to the processor 120 or the graphic processing unit 410 so that the processor 120 or the graphic processing unit 410 can process an image generated by the processor 120 or the graphic processing unit 410 according to the changed resolution.

According to various embodiments, if an image is generated in the library area 530, the processor 120 or the graphic processing unit 410 in the hardware area 550 can generate a screen to be displayed in the display 160 according to the image, and the display driver 541 in the kernel area 541 can allocate a resource to the display 160 and transmit the generated screen to the display 160 so that the generated screen can be displayed in the display 160.

According to various embodiments, at least one part of the surface manager 532 can be configured with software, firmware, hardware, or their combinations. At least one part of the surface manager 532 can be implemented (e.g., executed) by a processor (e.g., processor 120). At least one part of the surface manager 532 may include a module, routine, set of commands, or process for performing at least one function.

An electronic device 101 according to various embodiments of the present invention may include a display 160; an input/output interface 150; a memory 130; and a processor 120. The processor 120 can control to change resolution of a screen being displayed through the display 160 connected functionally to the electronic device 101 if a system resource load is detected, and to display the screen through the display based on an image having the changed resolution.

According to various embodiments, the processor 120 can detect at least one of memory use higher than a predetermined value or power consumption higher than a predetermined value, detect a system resource load, and reduce the size of the screen and change the resolution.

According to various embodiments, the processor 120 can change the resolution by reducing the size of the screen.

According to various embodiments, the processor 120 can change the resolution according to a user input received through the input/output interface 150 or predetermined information stored in the memory 130.

According to various embodiments, the electronic device 101 can change the resolution by using a shader included in the graphic processing unit 410.

According to various embodiments, the processor 120 can control to generate an image based on the changed resolution and to store the image in a frame buffer.

According to various embodiments, the processor 120 can control to display a user interface including an icon related to the change of the resolution on the display 160 if a system resource load is detected, and to receive a user input obtained by the user interface through the input/output interface 150 and change the resolution.

According to various embodiments, the processor 120 can control to display a screen shot on the display 160 based on a user input requesting for changing the resolution and to display a user interface for changing the resolution on the screen shot, and to receive a user input for adjusting the resolution through the user interface and change the resolution.

According to various embodiments, the processor 120 can control to display a notification status bar including a user interface for changing the resolution through the display 160, and to receive a user input for adjusting the resolution through the user interface and change the resolution.

According to various embodiments, if a user input requesting for displaying a recent application tab is received, the processor 120 can release an image of an application from a frame buffer, buffer application execution information and change the resolution of the application, and if re-launching of the application is requested, the processor 120 can control to display the screen on the display 160 by using an image having the changed resolution.

Figure 6:
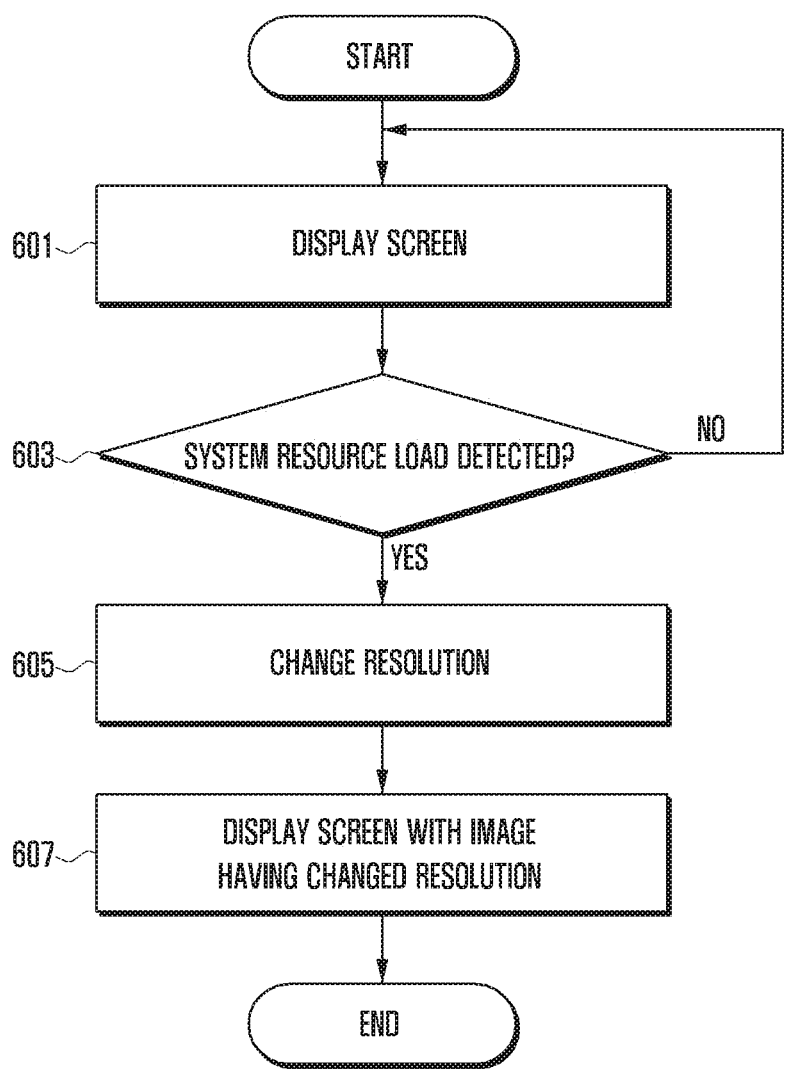
FIG. 6 is a flowchart illustrating a method for adjusting resolution of an electronic device according to various embodiments of the present invention.

FIG. 6 is a flowchart illustrating a method for adjusting resolution of an electronic device 101 according to various embodiments of the present invention.

With reference to FIG. 6, at operation 601, the electronic device 101 displays a screen in the display 160 based on a command (i.e., control) of the processor 120.

According to various embodiments, the screen displayed at operation 601 may be an application execution screen. According to various embodiments, the screen displayed at operation 601 may be a home screen. According to various embodiments, while the electronic device 101 displays a screen in the foreground of the display 160, at least one application can be executed in the background.

At operation 601, a screen displayed is displayed in the display 160 with a first resolution identical or similar to the resolution physically supported by the display 160.

At operation 603, the electronic device 101 detects a system resource load according to a command (i.e., control) of the processor 120. The system resource load can arise if the screen (e.g., application execution screen) is displayed in a high resolution (e.g., first resolution).

If the system resource load is not detected at operation 603, the electronic device 101 branches off to operation 601.

If the system resource load is detected at operation 603, the electronic device 101 changes the resolution of the screen being displayed in the display 160 according to the command (e.g., control) of the processor 120 at operation 605.

According to various embodiments, the system resource load may include a case that the consumption of the system resource (e.g., use of memory) becomes greater than a predetermined value because a plurality of applications are executed or a case that the consumption of the system resource becomes greater than a predetermined value because one application has a lot of data to be processed. The system resource load may also include a case that the electronic device 101 consumes more power than a predetermined value.

The operation of changing the resolution may include an operation of changing a screen having the first resolution to a screen having a lower resolution than the first resolution. A second resolution may be a virtual resolution different from the resolution physically supported by the display 160. The electronic device 101 can render a screen having the second resolution and display the rendered screen by up-scaling. According to various embodiments, a screen already rendered in a large size can be reduced by down-sampling, and the operation of down-sampling may include methods of applying a blurring, jaggies, and aliasing effects to the screen.

At operation 605, the resolution is changed according to a user input value or a predetermined value of the electronic device 101 if a system resource load is detected.

According to various embodiments, the resolution may be information for reducing the screen size according a user input. The resolution may be information for rendering a screen.

According to various embodiments, if the system resource load is detected, the resolution may be changed according to a predetermined value of the system without using a user input.

At operation 607, the electronic device 101 displays a screen with an image having the changed resolution in the display 160 according to a command (e.g., control) of the processor 120. The screen displayed at operation 607 may have the second resolution.

According to various embodiments, the consumption of a system resource or an electric current can be reduced if the screen is displayed with an image having the changed resolution in the display 160.

According to various embodiments, when the screen is displayed in the display 160 with an image having the changed resolution, the consumption of system resource by the electronic device 101 is listed in Table 1.

TABLE 1

| Screen | Before changing resolution | After changing resolution |
|---|---|---|
| | Memory use (MBs) | |
| Home screen (moving screen) | 113.2 | 47.8 |
| Home screen (still screen) | 92.7 | 44.9 |
| View list | 121.5 | 44.9 |
| Game execution screen | 128.8 | 55.1 |

In case of displaying an image having the changed resolution on the display 160, the power consumption of the electronic device 101 is shown in Table 2.

TABLE 2

| Screen | Before changing resolution | After changing resolution |
|---|---|---|
| | Power consumption (Joules) | |
| View list (scroll up/down) | 80 | 54 |
| Game execution screen | 200 | 190 |
| Internet browser execution screen | 181 | 160 |

Figure 7:
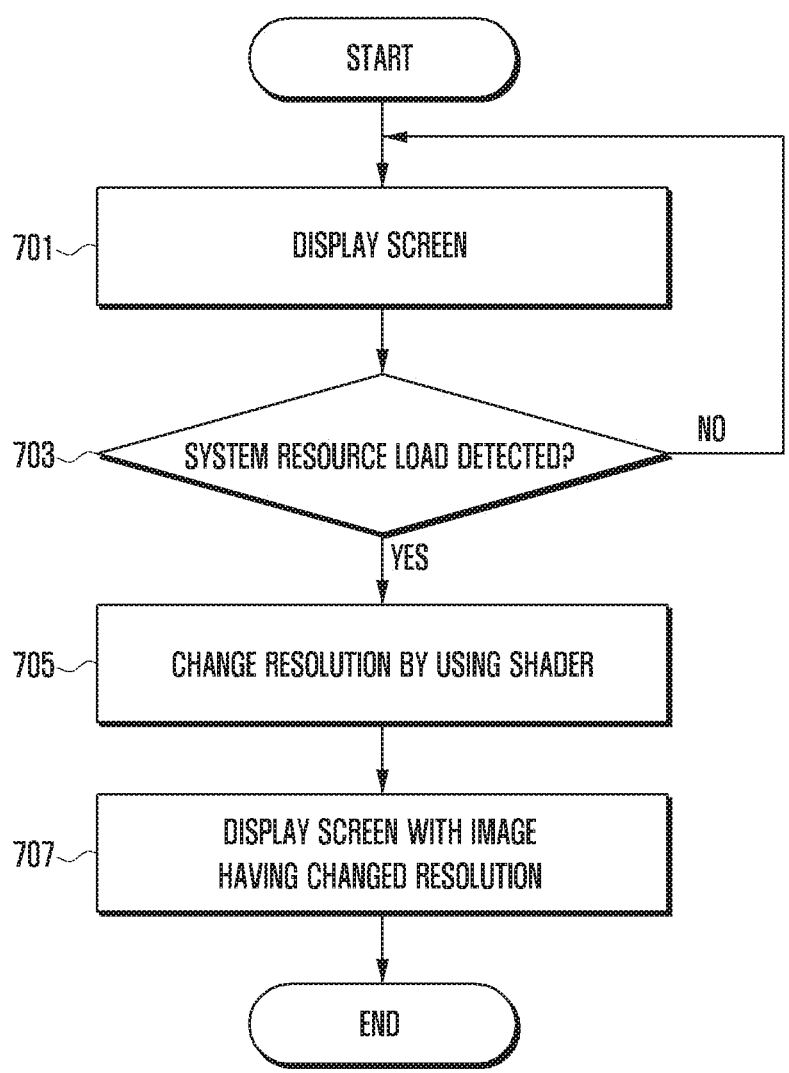
FIG. 7 is a flowchart illustrating a method for adjusting resolution of an electronic device according to various embodiments of the present invention.

FIG. 7 is a flowchart illustrating a method for adjusting resolution of an electronic device 101 according to various embodiments of the present invention.

At operation 701, the electronic device 101 displays a screen in the display 160 according to a command (i.e., control) of the processor 120.

According to various embodiments, the screen displayed at operation 701 may be an application execution screen. According to various embodiments, the screen displayed at operation 701 may be a home screen. According to various embodiments, while the electronic device 101 displays a screen in the foreground of the display 160, at least one application may be executed in the background. The resolution of the screen displayed at operation 701 is a first screen identical or similar to the resolution physically supported by the display 160.

At operation 703, the electronic device 101 detects a system resource load according to a command (i.e., control) of the processor 120.

According to various embodiments, the system resource load may arise in case that the consumption of the system resource increases because a plurality of applications is executed or incase that the consumption of the system resource increases because one application has much data to be processed.

If the system resource load is not detected at operation 703, the electronic device 101 branches off to operation 701.

If the system resource load is detected at operation 703, the electronic device 101 changes the resolution of the screen being displayed in the display 160 by using a shader according to a command (i.e., control) of the processor 120 at operation 705.

According to various embodiments, the shader is a module included in the graphic processing unit 410, and may be configured with software or hardware for calculating a rendering effect. According to various embodiments, the shader can calculate a material property, shade, color, shape, and space in a rendering pass process.

According to various embodiments, if a shader is used for changing the resolution of a displaying screen, the resolution of the screen can be changed without changing an image stored in a frame buffer.

According to various embodiments, if a system resource load is detected, the electronic device 101 can change the resolution of the screen by using a shader according to a command (i.e., control) of the processor 120 (e.g., down-sampling or up-sampling).

According to various embodiments, the changed resolution may include information related to the second resolution lower than the first resolution.

At operation 707, the electronic device 101 displays an image having the changed resolution in the display 160 according to a command (i.e., control) of the processor 120.

Figure 8:
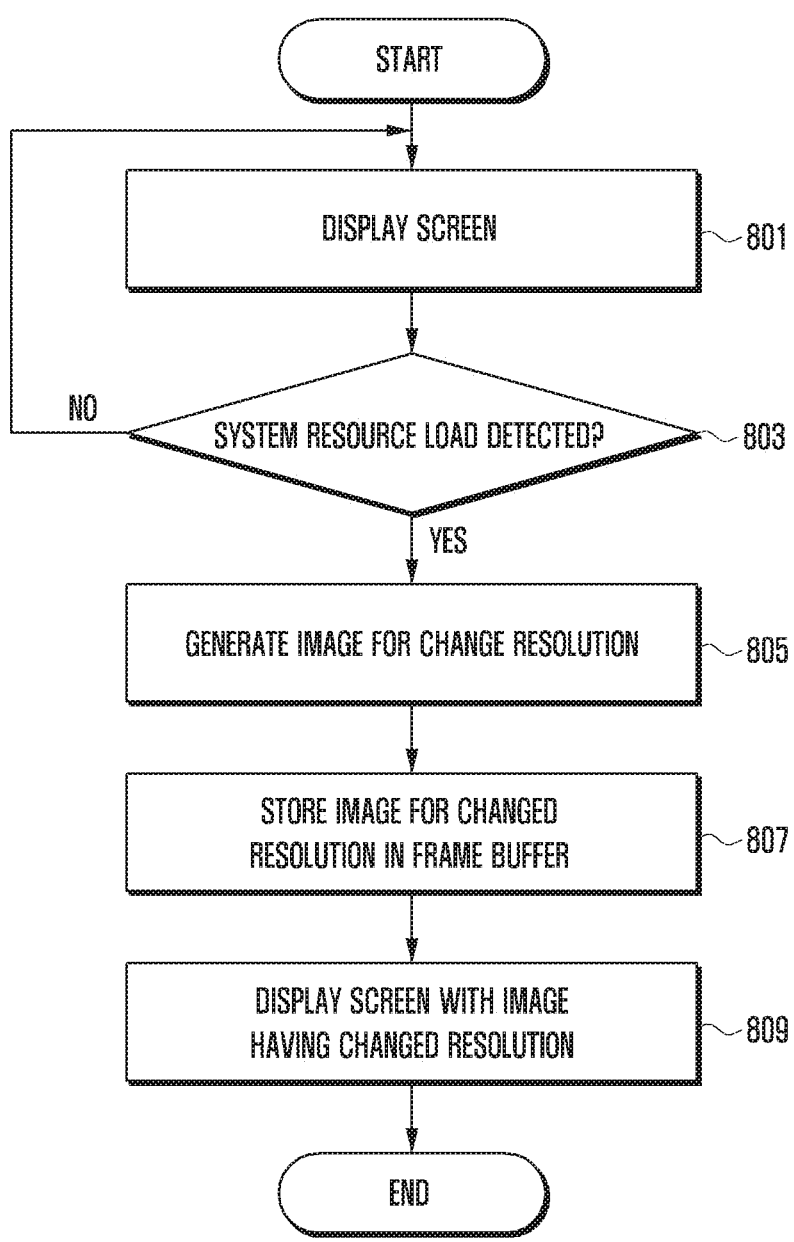
FIG. 8 is a flowchart illustrating a method for adjusting resolution of an electronic device according to various embodiments of the present invention.

FIG. 8 is a flowchart illustrating a method for adjusting resolution of an electronic device 101 according to various embodiments of the present invention.

At operation 801, the electronic device 101 displays a screen in the display 160 according to a command (i.e., control) of the processor 120.

According to various embodiments, the screen displayed at operation 801 may be an application execution screen. According to various embodiments, the screen displayed at operation 801 may be a home screen. According to various embodiments, while the electronic device 101 displays a screen in the foreground of the display 160, at least one application may be executed in the background. The resolution of the screen displayed at operation 801 is a first screen identical or similar to the resolution physically supported by the display 160.

At operation 803, the electronic device 101 detects a system resource load according to a command (i.e., control) of the processor 120.

According to various embodiments, the system resource load may arise in case that the consumption of the system resource increases because a plurality of applications is executed or incase that the consumption of the system resource increases because one application has much data to be processed.

If the system resource load is not detected at operation 803, the electronic device 101 branches off to operation 801.

If the system resource load is detected at operation 803, the electronic device 101 generates an image having the changed resolution according to a command (i.e., control) of the processor 120 at operation 805. The image may include a screen resolution as well as information related to configurations such as a screen surface, layer, or window.

According to various embodiments, the changed resolution may include information related to a second resolution lower than a first resolution. The information related to the second resolution may include information related to a screen size and reduction to a smaller size than that of the first resolution.

According to various embodiments, if a system resource load is detected, the resolution can be changed according to a predetermined value of a system without using a user input related to the screen size.

At operation 807, the electronic device 101 stores the image having the changed resolution in a frame buffer according to a command (i.e., control) of the processor 120. Alternatively, the electronic device 101 renders the image having the changed resolution in the buffer frame according to a command (i.e., control) of the processor 120 at operation 807.

Here, images having different resolutions each other can be temporarily stored in a frame buffer and shared by applications or contents. The electronic device 101 can adjust the size of the frame buffer so that the images having different resolutions (e.g., first resolution and second resolution) are shared efficiently by the applications or contents.

At operation 809, the electronic device 101 displays the image having the changed resolution in the display 160 according to a command (i.e., control) of the processor 120.

Figure 9:
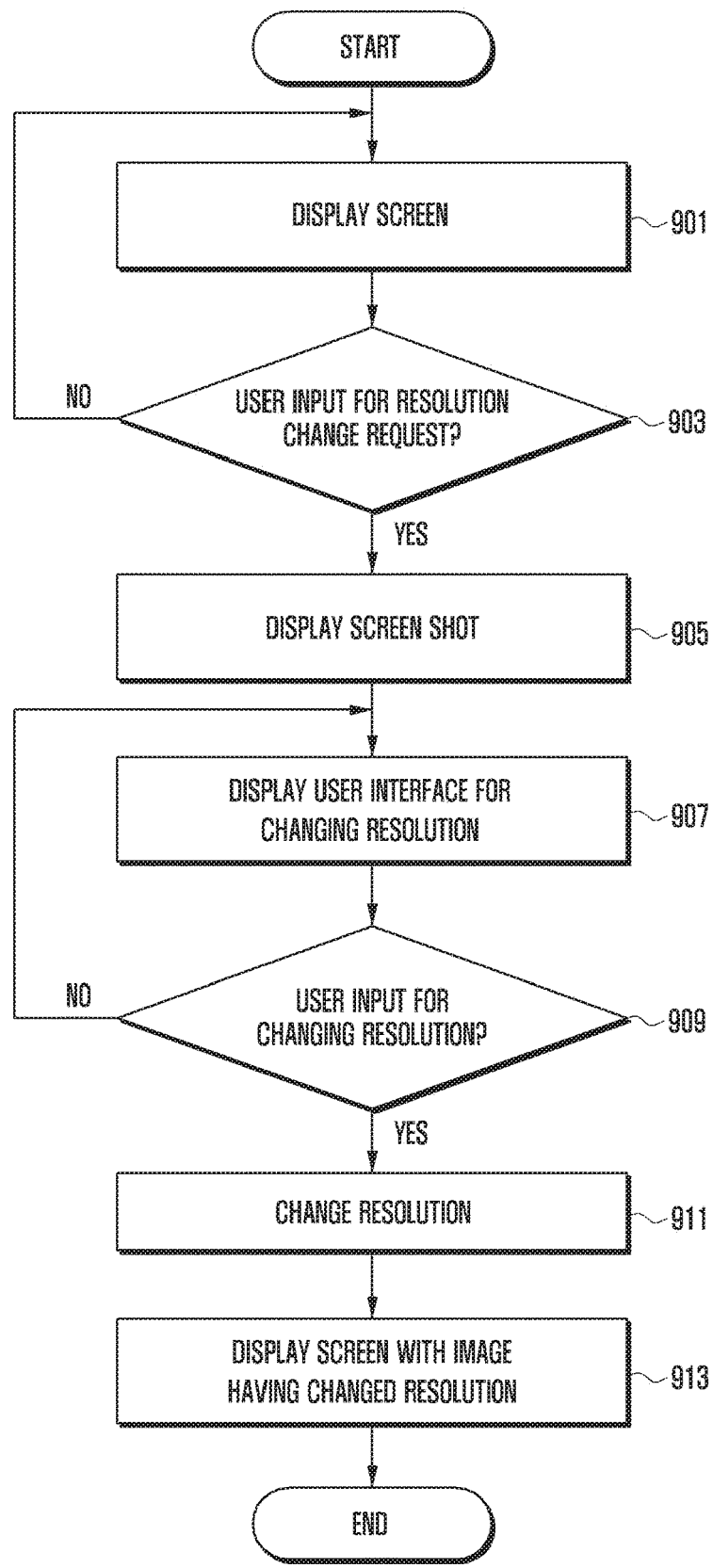
FIG. 9 is a flowchart illustrating a method for adjusting resolution of an electronic device according to various embodiments of the present invention.

FIG. 9 is a flowchart illustrating a method for adjusting resolution of an electronic device 101 according to various embodiments of the present invention.

At operation 901, the electronic device 101 displays a screen in the display 160 according to a command (i.e., control) of the processor 120.

According to various embodiments, the screen displayed at operation 901 may be an application execution screen. According to various embodiments, the screen displayed at operation 901 may be a home screen. According to various embodiments, while the electronic device 101 displays a screen in the foreground of the display 160, at least one application may be executed in the background. The resolution of the screen displayed at operation 901 is a first screen identical or similar to the resolution physically supported by the display 160.

At operation 903, the electronic device 101 identifies a user input requesting for changing the resolution according to a command (i.e., control) of the processor 120.

If the user input for changing the resolution is not identified at operation 903, the electronic device 101 branches off to operation 901.

If the user input for changing the resolution is identified at operation 903, the electronic device 101 displays a screen shot in the display 160 according to a command (i.e., control) of the processor 120 at operation 905. The screen shot may be an application execution screen or a home screen.

At operation 907, the electronic device 101 displays a user interface related to the change of the resolution according to a command (i.e., control) of the processor 120. The user interface may be a graphical user interface including an object.

According to various embodiments, the user interface related to the change of the resolution can be displayed by overlapping the screen shot. The user interface can be displayed in a transparent or semi-transparent form.

At operation 909, the electronic device 101 identifies a user input related to the adjustment of the resolution under the control of the processor 120 control.

If the user input related to the adjustment of the resolution is not detected at operation 909, the electronic device 101 branches off to operation 907.

If the user input related to the adjustment of the resolution is detected at operation 909, the electronic device 101 changes the resolution according to a command (i.e., control) of the processor 120 at operation 911.

The changed resolution may include information related to a second resolution lower than a first resolution. The information related to the second resolution may include information related to a screen size, information related to rendering, and information related to reduction of the screen size to a smaller size than that of the first resolution.

At operation 913, the electronic device 101 displays the image having the changed resolution in the display 160 according to a command (i.e., control) of the processor 120.

FIGS. 10a and 10b illustrate a method for adjusting resolution of the electronic device 101 of FIG. 9 according to various embodiments of the present invention.

In reference number 1001, the electronic device 101 can display a screen shot 1020 on the display 160 according to a user input requesting for a resolution change.

In reference number 1003, the electronic device 101 can display a user interface 1030 for changing the resolution. The user interface 1030 may be a graphic user interface including an object. The user interface 1030 may be a seekbar including a thumbnail object. If the thumbnail moves on the seekbar according to a user input, a screen shot 1040 having a changed size can be displayed by overlapping the screen shot 1020.

In reference number 1005, the electronic device 101 can display a screen shot 1041 having resolution changed by the user input in the display 160. The screen shot 1041 having a changed resolution may be identical to the screen shot 1040 having a change size. According to various embodiments, the screen of reference number 1005 is a screen shot after changing the resolution, and this screen may not be displayed after changing the application screen with the corresponding resolution.

In reference number 1011, the electronic device 101 can display a screen shot 1050 on the display 160 according to a user input requesting for a resolution change.

In reference number 1013, the electronic device 101 can display a second user interface 1070 for changing resolution on a screen shot 1051. The second user interface 1070 may be a graphic user interface including an object. The second user interface 1070 displayed in the display 160 may be a user interface for changing rendering information. The second user interface 1070 may be seekbar including a thumbnail object. If the thumbnail object moves on the seekbar according to a user input, the rendering information of the screen shot 1050 can be adjusted.

If the thumbnail object for changing resolution included in the second user interface 1070 moves on the seekbar according to a user input, the screen shot 1051 having a changed resolution can be displayed.

In reference number 1015, the electronic device 101 can display the screen shot 1051 having resolution change by a user input on the display 160. According to various embodiments, the screen of reference number 1015 is a screen shot after changing the resolution, and this screen may not be displayed after the application screen is changed to the corresponding screen.

Figure 11:
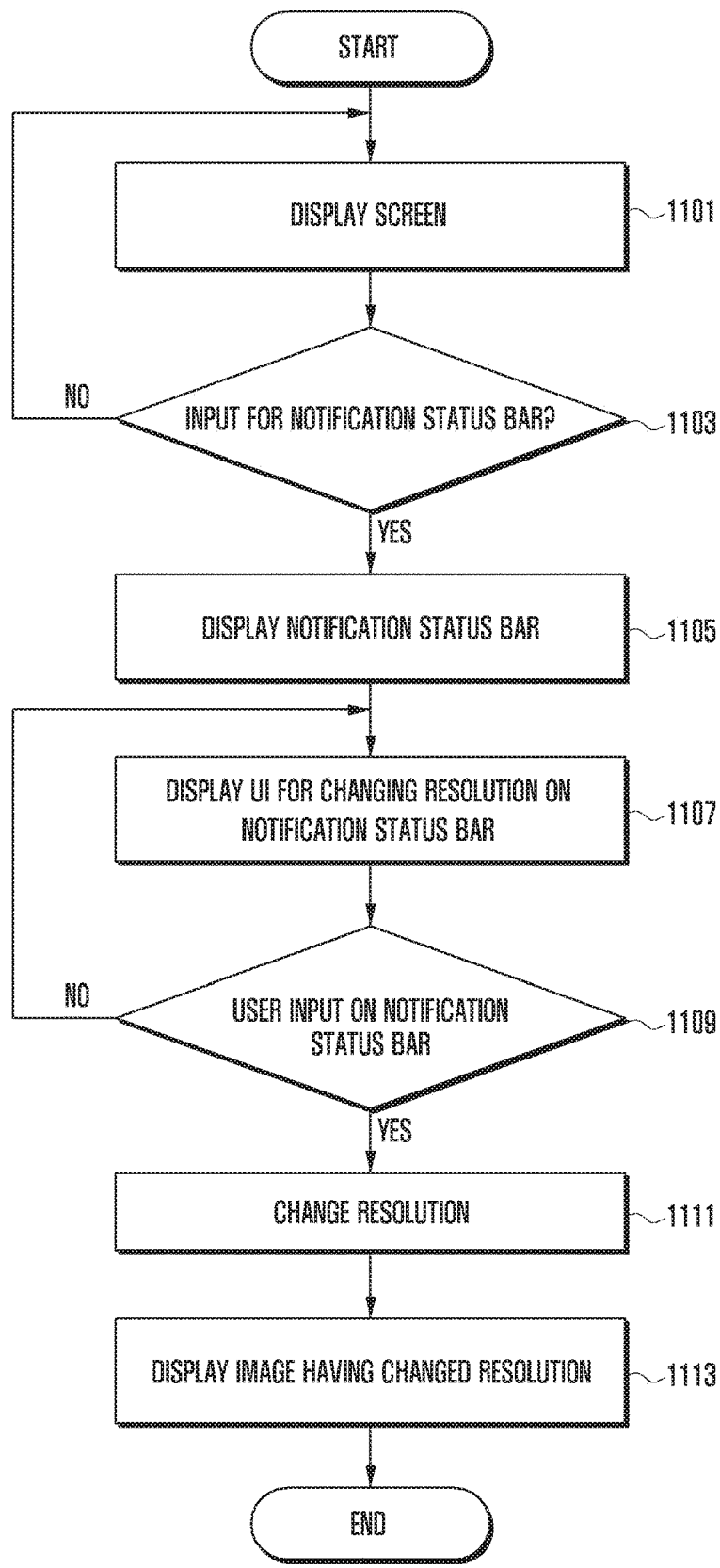
FIG. 11 is a flowchart illustrating a method for adjusting resolution of an electronic device according to various embodiments of the present invention.

FIG. 11 is a flowchart illustrating a method for adjusting resolution of an electronic device 101 according to various embodiments of the present invention.

At operation 1101, the electronic device 101 displays a screen in the display 160 according to a command (i.e., control) of the processor 120.

According to various embodiments, the screen displayed at operation 901 may be an application execution screen. According to various embodiments, the screen displayed at operation 901 may be a home screen. The resolution of the screen displayed at operation 701 is a first screen identical or similar to the resolution physically supported by the display 160.

At operation 1103, the electronic device 101 identifies a user input related to a notification status bar according to a command (i.e., control) of the processor 120.

The user input related to the notification status bar may be a user input requesting for displaying the notification status bar.

If the user input related to a notification status bar is not identified at operation 1103, the electronic device 101 branches off to operation 1101.

If the user input for a notification status bar is identified at operation 1103, the electronic device 101 displays the notification status bar in the display 160 according to a command (i.e., control) of the processor 120 at operation 1105. The notification status bar can be overlapped on a displaying screen. The notification status bar can be displayed in a transparent or semi-transparent form. The notification status bar may be a graphical user interface including an object.

At operation 1107, the electronic device 101 displays a user interface (UI) related to a resolution change on the notification status bar under the control of the processor 120.

At operation 1109, the electronic device 101 identifies whether a user input is detected from the user interface according to a command (i.e., control) of the processor 120.

If the user input is not detected from the user interface at operation 1109, the electronic device 101 branches off to operation 1107.

If the user input is detected from the user interface at operation 1109, the electronic device 101 changes the resolution according to the user input under the control of the processor 120 at operation 1111.

According to various embodiments, the changed resolution may include information related to a second resolution lower than a first resolution. The information related to the second resolution may include information related to a screen size, information related to rendering, and information related to reduction of the screen size to a smaller size than that of the first resolution.

At operation 1113, the electronic device 101 displays the image having the changed resolution in the display 160 according to a command (i.e., control) of the processor 120.

Figure 12:
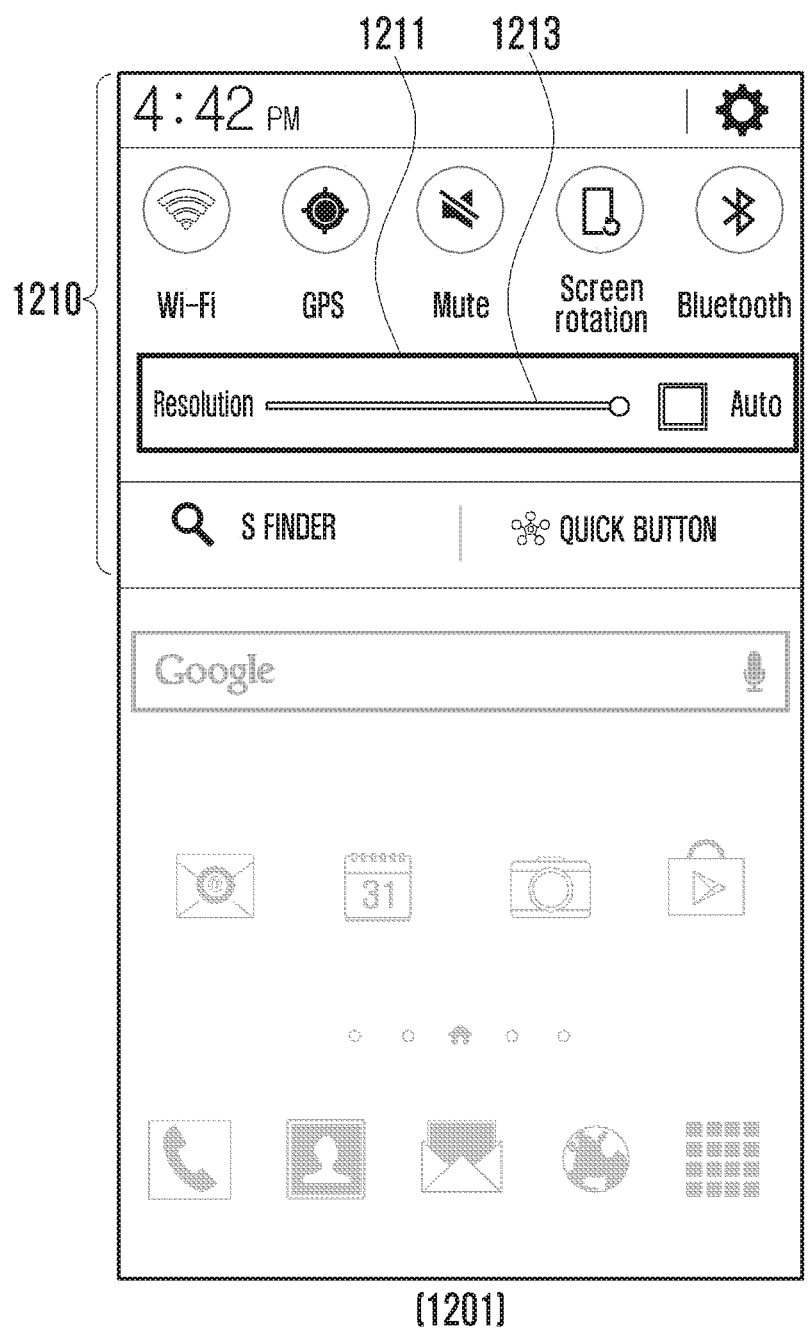
FIG. 12 illustrates a method for adjusting resolution of the electronic device of FIG. 11 according to various embodiments of the present invention.

FIG. 12 illustrates a method for adjusting resolution of the electronic device 101 of FIG. 11 according to various embodiments of the present invention.

In reference number 1201, the electronic device 101 can display a notification status bar 1210. The notification status bar can be displayed by overlapping a displaying screen. The notification status bar 1210 can be displayed in a transparent or semi-transparent form.

The electronic device 101 can display a user interface 1211 for changing resolution on the notification status bar 1210.

The user interface 1211 may a seekbar 1213 including a thumbnail object. If the thumbnail object moves on the seekbar 1213 according to a user input, the electronic device 101 can change the resolution according to the user input.

Figure 13:
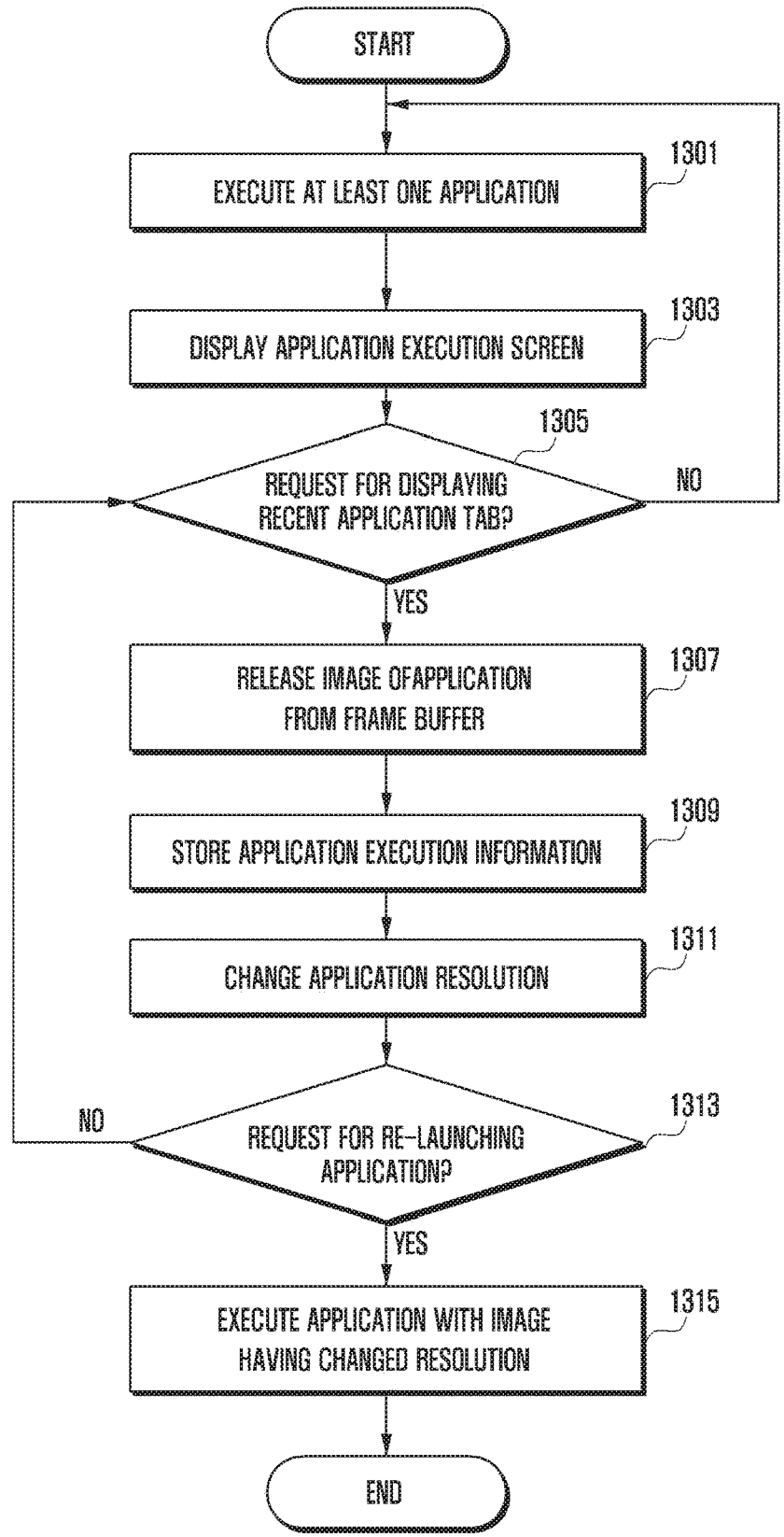
FIG. 13 a flowchart illustrating a method for adjusting resolution of an electronic device according to various embodiments of the present invention.

FIG. 13 is a flowchart illustrating a method for adjusting resolution of an electronic device 101 according to various embodiments of the present invention.

At operation 1301, the electronic device 101 execute at least one application according to a command (i.e., control) of the processor 120.

At operation 1303, the electronic device 101 displays an application execution screen in the display according to a command (i.e., control) of the processor 120. The resolution of the application execution screen displayed at operation 1303 is a first resolution which may be identical or similar to resolution physically supported by the display 160.

At operation 1305, electronic device 101 identifies whether a recent application tab is requested to display according to a command (i.e., control) of the processor 120.

If the recent application tab is not requested at operation 1305, the electronic device 101 branches off to operation 1303.

If the recent application tab is requested at operation 1305 at operation 1305, the electronic device 101 displays the recent application tab and release an image of an executing application from a frame buffer according to a command (i.e., control) of the processor 120 at operation 1307.

At operation 1307, the electronic device 101 stores application execution information according to a command (i.e., control) of the processor 120. The operation of storing the application execution information may be a buffering operation. The application execution information may be at least one of resource information or content information of an executing application.

At operation 1311, the electronic device 101 changes the resolution of the application execution screen according to a command (i.e., control) of the processor 120.

According to various embodiments, the changed resolution may include information of a second resolution lower than a first resolution. The information of the second resolution may include information related to a screen size, information related to rendering, and/or information related to reduction of the screen size to a smaller size than that of the first resolution.

At operation 1313, the electronic device 101 identifies whether re-launching of the application is requested according to a command (i.e., control) of the processor 120.

If the re-launching of the application is not requested at operation 1313, the electronic device 101 branches off to operation 1305.

If the re-launching of the application is requested at operation 1313, the electronic device 101 displays an image having the changed resolution in the display 160 according to a command (i.e., control) of the processor 120 at operation 1315.

Figure 14:
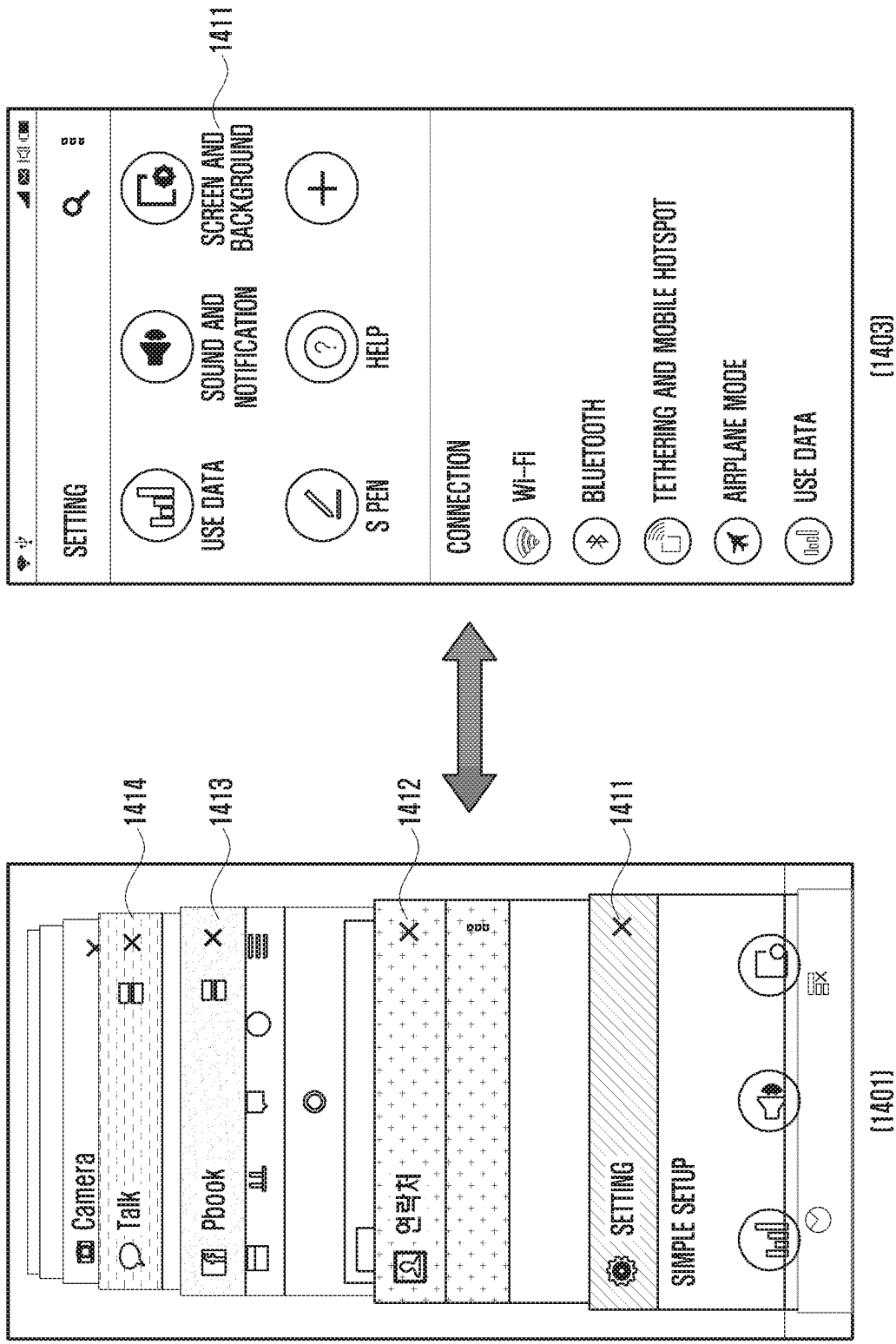
FIG. 14 illustrates a method for adjusting resolution of the electronic device of FIG. 13 according to various embodiments of the present invention.

FIG. 14 illustrates a method for adjusting resolution of the electronic device 101 of FIG. 13 according to various embodiments of the present invention.

In reference number 1401, if a recent application tab is requested to display, the electronic device 101 can display a recent application tabs 1411, 1412, 1413, and 1414, release an image of an executing application from a frame buffer, and change the resolution of the executing application 1411. In this case, the screen of reference number 1403 may be an execution screen before requesting for displaying the recent application tab, and the resolution may be a first resolution.

In reference number 1403, if re-launching of the application is requested in a state of displaying the recent application tabs 1411, 1412, 1413, and 1414 as shown in reference number 1401, the screen 1411 of an image having the changed resolution can be displayed in the display 160.

Figure 15:
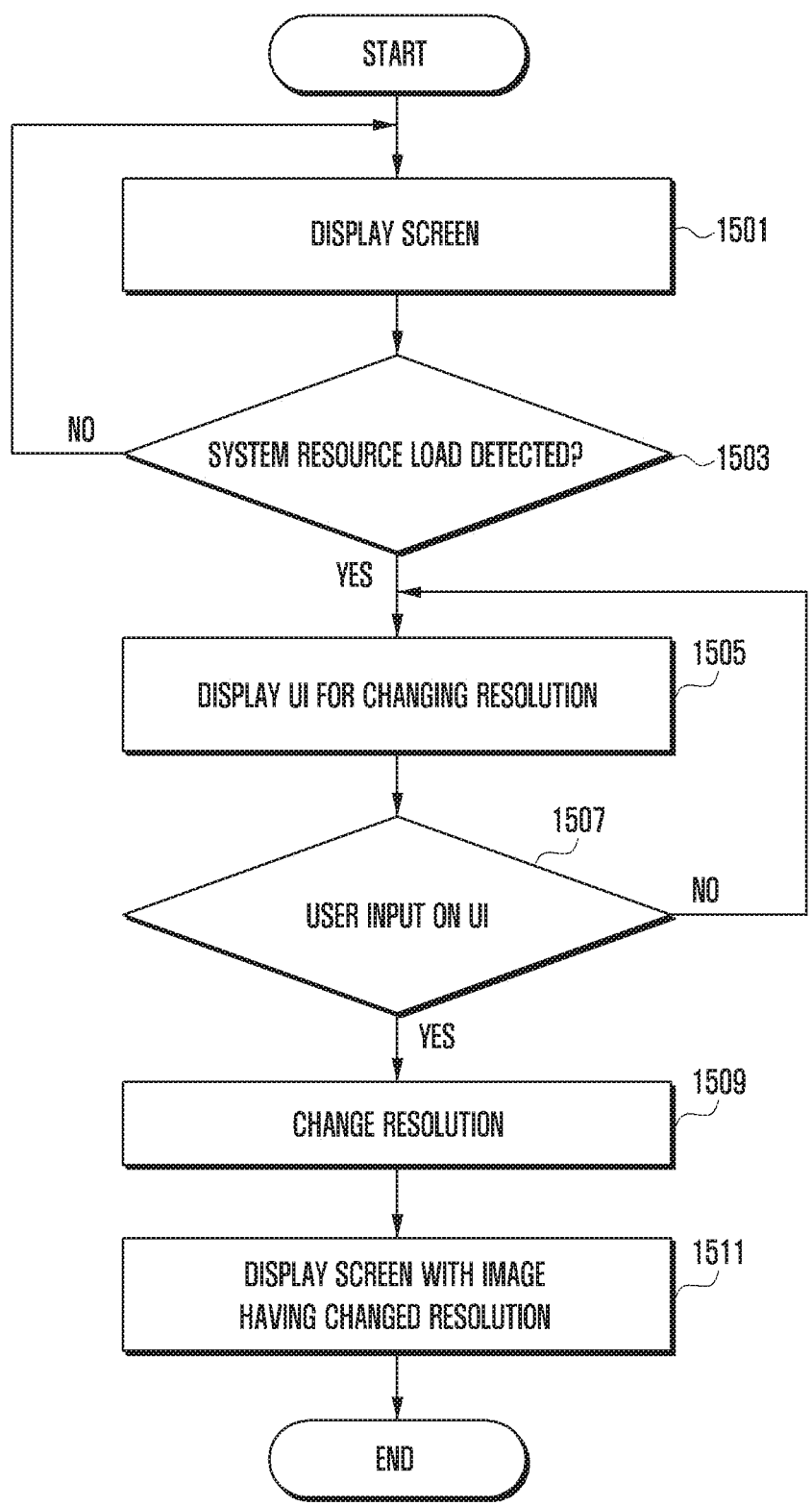
FIG. 15 is a flowchart illustrating a method for adjusting resolution of an electronic device according to various embodiments of the present invention.

FIG. 15 is a flowchart illustrating a method for adjusting resolution of an electronic device 101 according to various embodiments of the present invention.

At operation 1501, the electronic device 101 displays a screen in the display 160 under the control of the processor 120.

According to various embodiments, the screen displayed at operation 1501 may be an application execution screen. According to various embodiments, the screen displayed at operation 1501 may be a home screen. The resolution of the screen displayed at operation 1501 is a first screen identical or similar to the resolution physically supported by the display 160.

At operation 1503, the electronic device 101 detects a system resource load according to a command (i.e., control) of the processor 120.

According to various embodiments, the system resource load may arise in case that the consumption of the system resource increases because a plurality of applications is executed or incase that the consumption of the system resource increases because one application has much data to be processed.

If the system resource load is not detected at operation 1503, the electronic device 101 branches off to operation 1501.

If the system resource load is detected at operation 1503, the electronic device 101 displays a user interface for changing resolution according to a command (i.e., control) of the processor 120 at operation 1505. The user interface for changing resolution may be an item or an icon.

At operation 1507, the electronic device 101 identifies whether a user input is generated in a user interface according to a command (i.e., control) of the processor 120.

If the user input is not generated in the user interface at operation 1507, the electronic device 101 branches off to operation 1505.

If the user input is generated in the user interface at operation 1507, the electronic device 101 changes the resolution according to a command (i.e., control) of the processor 120.

According to various embodiments, the changed resolution may include information of a second resolution lower than a first resolution. The information of the second resolution may include information related to a screen size, information related to rendering, and/or information related to reduction of the screen size to a smaller size than that of the first resolution.

According to various embodiments if a system resource load is detected, the resolution can be changed according to a predetermined value of a system without using a user input.

At operation 1511, the electronic device 101 displays a screen of an image having the changed resolution in the display 160 according to a command (i.e., control) of the processor 120.

Figure 16:
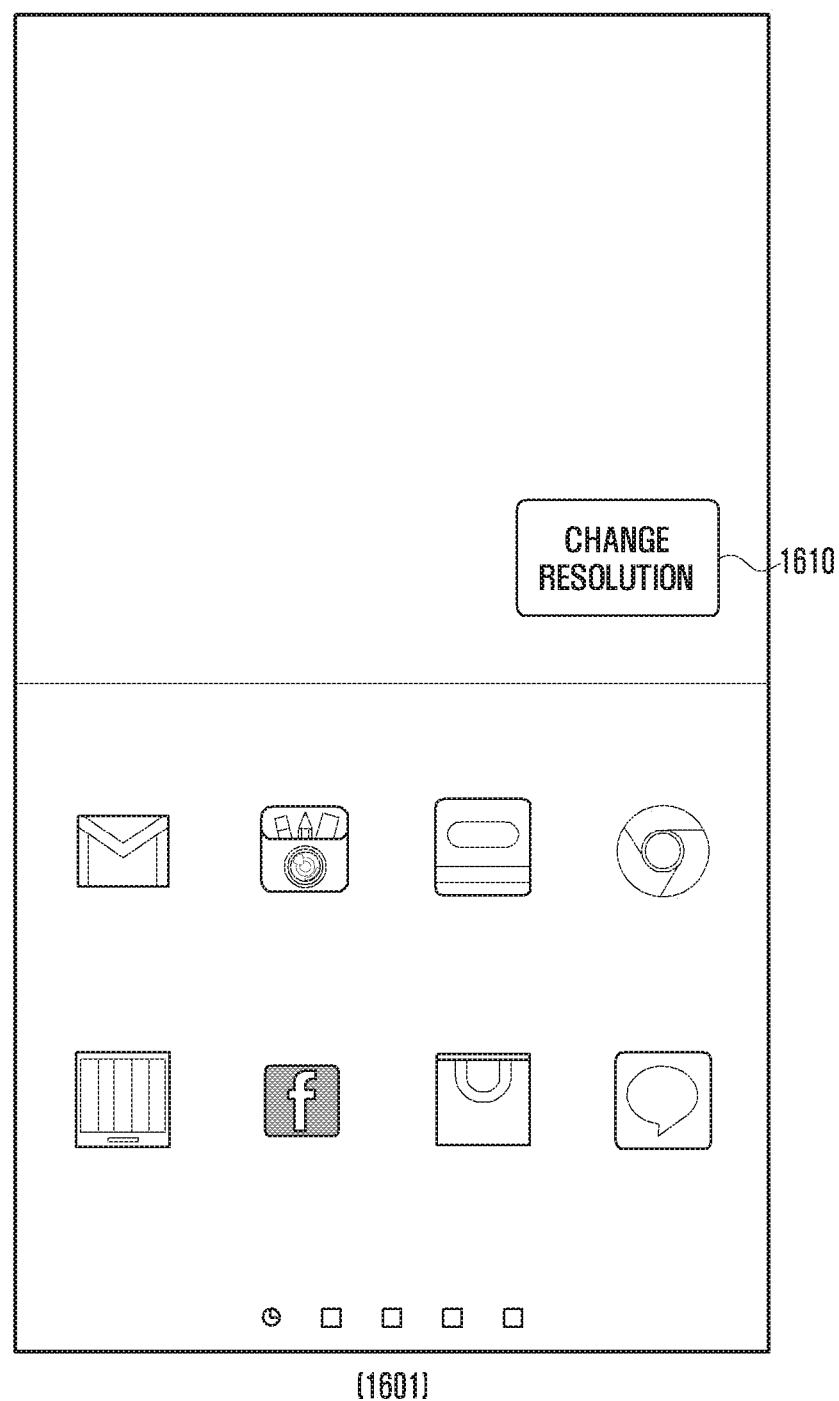
FIG. 16 illustrates a method for adjusting resolution of the electronic device of FIG. 15 according to various embodiments of the present invention.

FIG. 16 illustrates a method for adjusting resolution of the electronic device of FIG. 15 according to various embodiments of the present invention.

In reference number 1601, if the system resource load is detected, the electronic device 101 can display a user interface 1610 for changing resolution under the control of the processor 120. The user interface 1610 for changing resolution may be an item or an icon. If a user input is generated to display the user interface 1610 for changing resolution, the electronic device 101 can display a screen of an image having the changed resolution in the display 160.

According to various embodiments, if an external input (e.g., user input) is generated in the user interface 1610 for changing resolution, the electronic device 101 can display a seekbar (e.g., seekbar 1213) including a thumbnail object in at least one part of the display 160.

According to various embodiments, the user interface 1610 for changing resolution can be set to change an output method of the display 160 in the electronic device 101 such as a color, luminosity, transparency, display location, size, content displayed in at least one part of the display, or visual effect of the content.

According to various embodiments, a method for adjusting resolution of an electronic device 101 may include the operations of changing resolution of a screen being displayed through a display 160 connected functionally to the electronic device 101, if a system resource load is detected; and displaying the screen through the display 160 based on an image having the changed resolution.

According to various embodiments, in the above method, the operation of detecting a system resource load may include detecting at least one of memory use higher than a predetermined value and power consumption higher than a predetermined value.

According to various embodiments, in the above method, the operation of changing resolution may include the operation of reducing the size of the screen.

According to various embodiments, in the above method, the operation of changing resolution may include the operation of changing the resolution based on at least one of a user input or predetermined information.

According to various embodiments, in the above method, the operation of changing resolution may include the operation of changing the resolution by using a shader included in the graphic processing unit 410.

According to various embodiments, the above method may further include the operations of generating an image based on the changed resolution; and storing the image in a frame buffer.

According to various embodiments, in the above method, the operation of changing resolution may include operations of displaying a user interface including an icon related to the change of the resolution if a system resource load is detected, and changing the resolution based on the user input obtained through the user interface.

According to various embodiments, in the above method, the operation of changing resolution may include operations of displaying a screen shot based on the user input; displaying a user interface related to the change of the resolution on the screen shot; and receiving a user input related to the adjustment of the resolution through the user interface and changing the resolution.

According to various embodiments, in the above method, the operation of changing resolution may include operations of displaying a notification status bar including a user interface related to the change of the resolution through the display; and changing the resolution based on the user input obtained through the user interface.

According to various embodiments, in the above method, the operation of changing resolution may include the operations of releasing the image corresponding to an application from a frame buffer if a user input for displaying the application list is received; changing the resolution of the image; and displaying the screen based on the image having the changed resolution if re-launching of the application is requested.

The term "module" used in the present disclosure means a unit including at least one of hardware, software, firmware, or their combinations. For example the "module" can be used interchangeably with the terms of a unit, logic, logical block, component, or circuit. The "module" can be configured in a mechanical form or an electronical form. For example, the "module" according to the present disclosure may include at least one of an application-specific integrated circuit (ASIC) chip, field-programmable gate arrays (FPGAs), or programmable-logic device for executing certain operations, which are well known already or will be developed in future.

At least one part of the device (e.g., modules or their functions) or method (e.g., operations) according to various embodiments can be implemented by a command stored in computer-readable storage media in a program module form. If the command is executed by at least one processor (e.g., processor 120), the processor can perform a function of the corresponding command. The computer-readable storage media may be a memory 130.

The computer-readable storage media may include a hard disk, floppy disk, magnetic media (e.g., magnetic tape), optical media (e.g., compact disc read only memory (CD-ROM) and digital versatile disc (DVD)), magneto-optical media (e.g., floptical disk), and hardware device (e.g., read only memory (ROM), random access memory (RAM), or flash memory). Further, the command may include a high level language code executable by a computer using an interpreter as well as a machine language code created by a compiler. The hardware device can be configured with at least one software module to perform operations according to various embodiments, or vice versa.

According to various embodiments, in the storage media storing commands, the commands are set to perform at least one operation when executed by at least one processor, and the at least one operation may include the operations of changing resolution of a screen to be displayed through a display connected functionally to an electronic device; and displaying the screen through the display based on an image having the changed resolution, if a system resource load is detected from the electronic device.

According to various embodiments, in the operations of the storage media, the operation of detecting a system resource load may include the operation of detecting at least one of memory use higher than a predetermined value and power consumption higher than a predetermined value.

According to various embodiments, in the operation of the storage media, the operation of changing the resolution may include the operation of reducing the size of screen.

According to various embodiments, in the operation of the storage media, the operation of changing resolution may include the operation of changing the resolution based on at least one of a user input or predetermined information.

According to various embodiments, in the operation of the storage media, the operation of changing resolution may include the operation of changing resolution by using a shader included in the graphic processing unit 410.

According to various embodiments, the operation of the storage media may further include the operations of generating an image based on the changed resolution, and storing the image in a frame buffer.

According to various embodiments, in the operation of the storage media, the operation of changing resolution may include the operations of displaying a user interface including an icon related to the change of the resolution, and changing the resolution based on the user input obtained through the user interface, if a system resource load is detected.

According to various embodiments, in the operation of the storage media, the operation of changing resolution may include the operations of displaying a screen shot based on the user input, displaying a user interface related to the change of the resolution on the screen shot, and changing the resolution by receiving a user input related to the adjustment of the resolution through the user interface.

According to various embodiments, in the operation of the storage media, the operation of changing resolution may include the operations of displaying a notification status bar including a user interface related to the change of the resolution through the display, and changing the resolution based on the user input obtained through the user interface.

According to various embodiments, in the operation of the storage media, the operation of changing resolution may include the operations of releasing the image corresponding to an application from a frame buffer if a user input for displaying the application list is received, changing the resolution of the image, and displaying the screen based on the image having the changed resolution if re-launching of the application is requested.

A module or a program module according to various embodiments may include at least one of the aforementioned components, some of them may be omitted, or other additional components may be included. Operations according to various embodiments can be executed sequentially, parallel, repeatedly, or in a heuristic method by the module, program module, or other components. Further some of the operations can be executed in a different sequence or omitted, or other additional operations can be added. Although embodiments of the disclosure have been described in detail hereinabove, it should be understood that many variations and modifications of the basic inventive concept described herein will still fall within the spirit and scope of the disclosure as defined in the appended claims.

The invention claimed is:

1. A method for adjusting resolution of an electronic device, the method comprising:
    displaying a first screen including an image through a display, the image having a first resolution;
    in response to detecting a change in a system resource load, determining to change the first resolution of the image to a second resolution lower than the first resolution;
    rendering a second screen including the image having the second resolution; and
    displaying, through the display, the second screen by up-scaling,
    wherein the determining to change the first resolution of the image to the second resolution further comprises:
        displaying a screenshot based on a user input;
        displaying a user interface related to a change of a resolution of the screenshot; and
        receiving the user input related to the adjustment of the resolution through the user interface and changing of the resolution.

2. The method of claim 1,
    wherein the detecting of the system resource load further comprises:
        detecting at least one of memory use higher than a predetermined value and power consumption higher than a predetermined value, and
    wherein the determining to change the first resolution of the image further comprises:
        reducing the size of the first screen.

3. The method of claim 1, wherein the determining to change the first resolution of the image to the second resolution further comprises:
    changing the image from the first resolution to the second resolution based on at least one of the user input or predetermined information.

4. The method of claim 1, further comprising:
    generating a second image based on the second resolution; and
    storing the second image in a frame buffer.

5. The method of claim 1, wherein the determining to change the first resolution of the image to the second resolution further comprises:
    displaying a user interface including an icon related to a change of a resolution when the system resource load is detected; and
    changing the resolution based on the user input obtained through the user interface.

6. The method of claim 3, wherein the determining to change the first resolution of the image to the second resolution further comprises:
    displaying a notification status bar including a user interface related to the change of the resolution through the display; and
    changing the resolution based on the user input obtained through the user interface.

7. The method of claim 3, wherein the determining to change the first resolution of the image to the second resolution further comprises:
    releasing the image corresponding to an application from a frame buffer when the user input for displaying the application list is received;
    changing the first resolution of the image; and
    displaying the second screen based on the image having the second resolution when re-launching of the application is requested.

8. An electronic device comprising:
a display;
an input/output interface;
a memory; and
at least one processor is configured to:
- display a first screen including an image through a display, the image having a first resolution,
- in response to detecting a change in a system resource load, determining to change the first resolution of the image to a second resolution lower than the first resolution,
- render a second screen including the image having the second resolution,
- display, through the display, the second screen by up-scaling,
- display a screenshot on the display based on a user input requesting for a resolution change,
- display a user interface for changing a resolution of the screenshot, and
- receive the user input for adjusting the resolution through the user interface and change the resolution.

9. The electronic device of claim 8, wherein the at least one processor is further configured to control to:
- detect at least one of memory use higher than a predetermined value or power consumption higher than a predetermined value,
- detect the system resource load,
- reduce the size of the first screen, and
- change the resolution.

10. The electronic device of claim 8, wherein the at least one processor is further configured to change the image from the first resolution to the second resolution according to the user input received through the input/output interface or predetermined information stored in the memory.

11. The electronic device of claim 8, wherein the at least one processor is further configured to:
- generate a second image based on the second resolution, and
- store the second image in a frame buffer.

12. The electronic device of claim 8, wherein the at least one processor is further configured to:
- display a user interface including an icon related to a change of a resolution on the display when the system resource load is detected, and
- receive the user input obtained by the user interface through the input/output interface and change the resolution.

13. The electronic device of claim 10, wherein the at least one processor is further configured to:
- display a screenshot on the display based on the user input requesting for a resolution change,
- display a user interface for changing a resolution of the screenshot, and
- receive the user input for adjusting the resolution through the user interface and change the resolution.

14. The electronic device of claim 10, wherein the at least one processor is further configured to:
- display a notification status bar including a user interface for changing the resolution through the display, and
- receive the user input for adjusting the resolution through the user interface and change the resolution.

* * * * *